United States Patent [19]
Shibuya et al.

[11] Patent Number: 5,541,542
[45] Date of Patent: Jul. 30, 1996

[54] HALFTONE IMAGE DEVICE AND ITS DRIVING CIRCUIT

[75] Inventors: Akira Shibuya; Hiroyuki Kadowaki; Tomohiro Shinbo; Masayuki Iijima, all of Tokyo, Japan

[73] Assignee: Dai Nippon Printing Co., Ltd., Tokyo, Japan

[21] Appl. No.: 420,308

[22] Filed: Apr. 11, 1995

Related U.S. Application Data

[62] Division of Ser. No. 7,143, Jan. 21, 1993.

[30] Foreign Application Priority Data

| Jan. 22, 1992 | [JP] | Japan | 4-9259 |
| May 27, 1992 | [JP] | Japan | 4-134912 |
| Jun. 5, 1992 | [JP] | Japan | 4-145806 |
| Aug. 5, 1992 | [JP] | Japan | 4-208974 |

[51] Int. Cl.[6] .................................. H03K 3/017
[52] U.S. Cl. .................. 327/172; 327/111; 327/355; 327/361
[58] Field of Search ..................... 327/172, 111, 327/355, 361

[56] References Cited

U.S. PATENT DOCUMENTS

| 4,149,183 | 4/1979 | Pellar et al. | 358/75 |
| 4,765,720 | 8/1988 | Toyono et al. | 350/350 |
| 5,172,132 | 12/1992 | Haneda et al. | 346/1.1 |
| 5,311,169 | 5/1994 | Inada et al. | 340/781 |

*Primary Examiner*—Margaret Rose Wambach
*Attorney, Agent, or Firm*—Dellett and Walters

[57] ABSTRACT

The invention makes it possible to drive a halftone image device and achieve high halftone reproduction by allowing at least one of the leading and trailing edges of a pulse width-modulated signal applied to a recording head, or forming amplitude- and width-modulated pulses, respectively, as driving pulses for placing one dot under halftone control, and changing a pulse width change of pulse width modulation in a stepwise manner, using the pulse width of the amplitude-modulated pulse as a unit pulse width. The invention intends to achieve high-voltage and high-speed pulse output and low power consumption by converting input data such as halftone image data to a voltage signal, superposing pulse voltages of opposite polarities and applying the resulting signal to a switching circuit constituting an output state in the form of a switching signal, and also makes it possible to achieve high speed and high-voltage driving by connecting at least one of equivalent two-terminal elements in series to at least one of the respective driving elements of a complementary FET driving circuit, said equivalent two-terminal elements are each put on with a current of a certain or higher value passing therethrough to show constant-voltage characteristics and put off with a current of a certain or lower value passing therethrough to become a constant resistance.

11 Claims, 27 Drawing Sheets

$t_1$  $t_2$

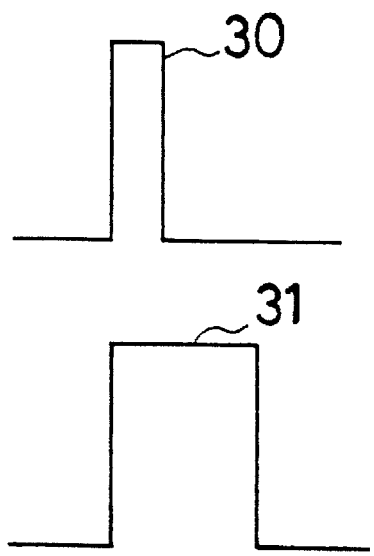 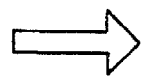 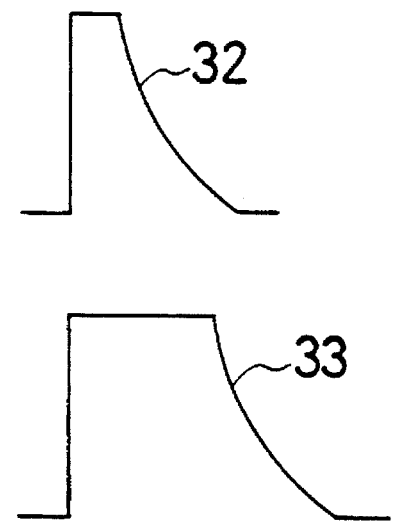
FIG.9(a) FIG.9(b)
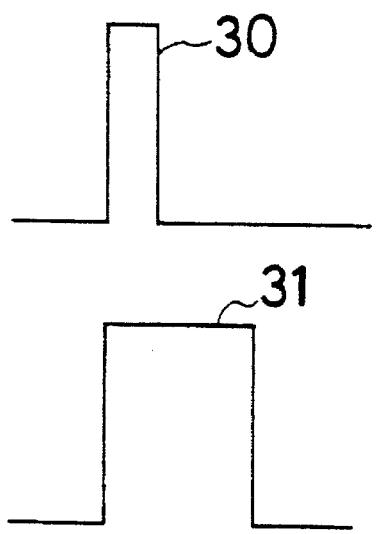 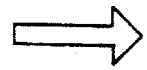 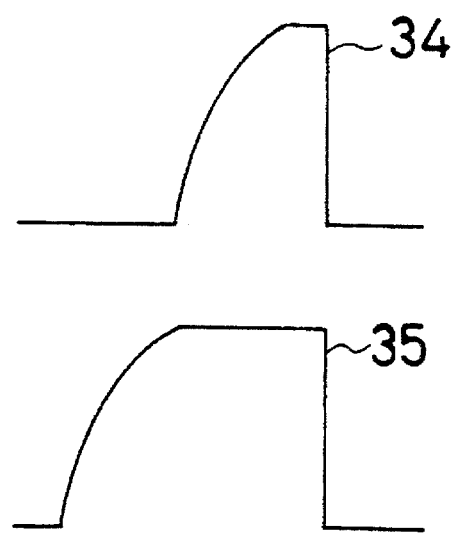
FIG.10(a) FIG.10(b)

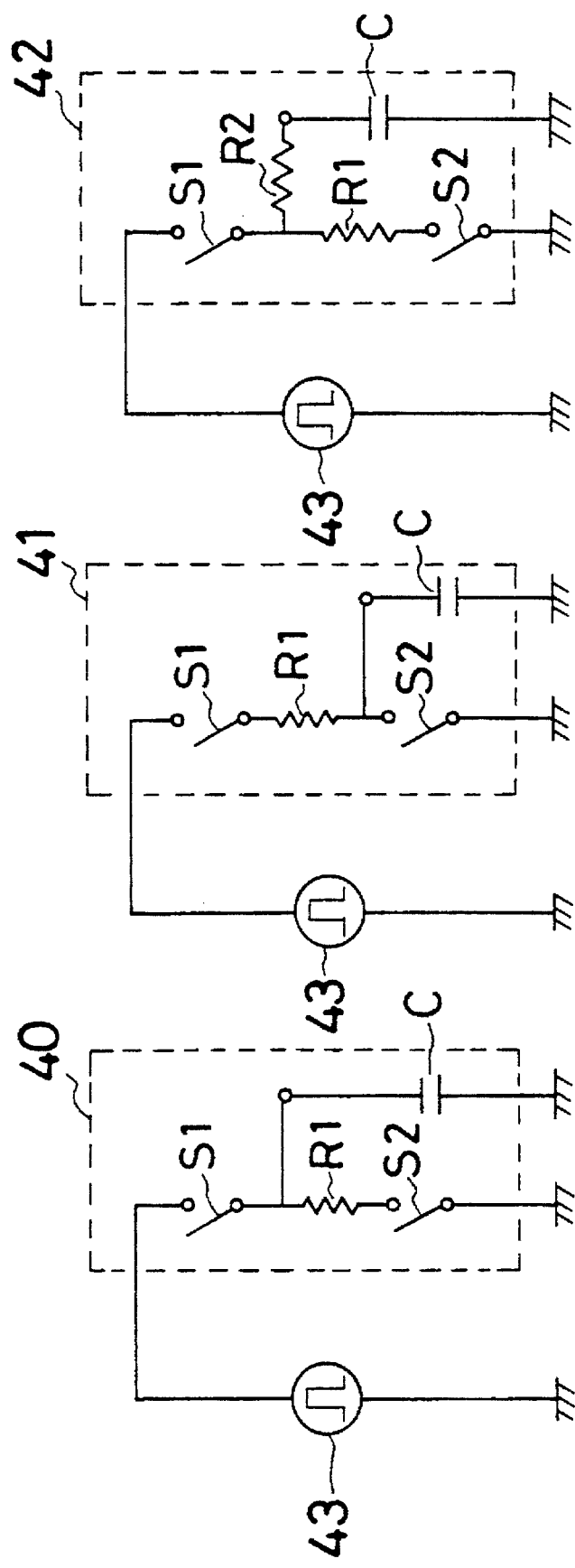

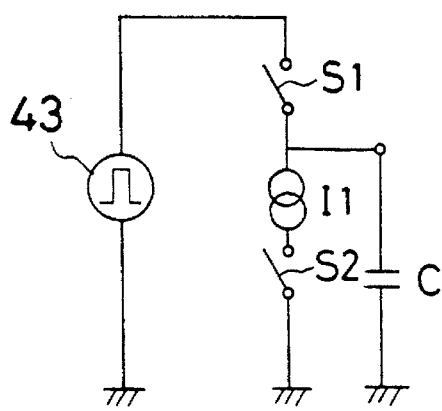
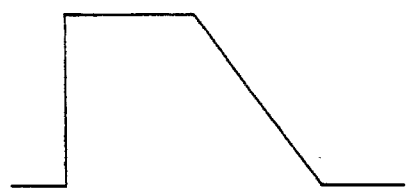
FIG.13(a)     FIG.13(b)
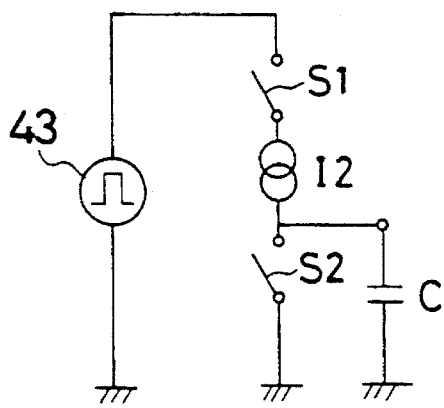
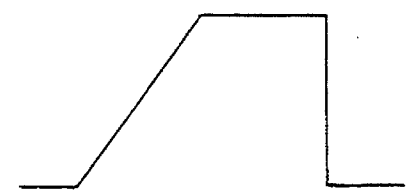
FIG.13(c)     FIG.13(d)
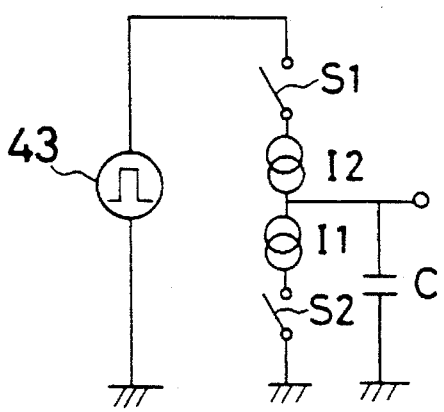
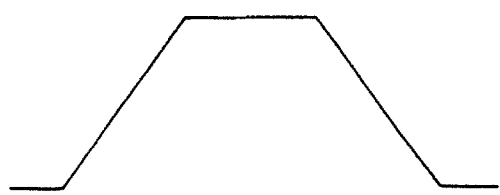
FIG.13(e)     FIG.13(f)

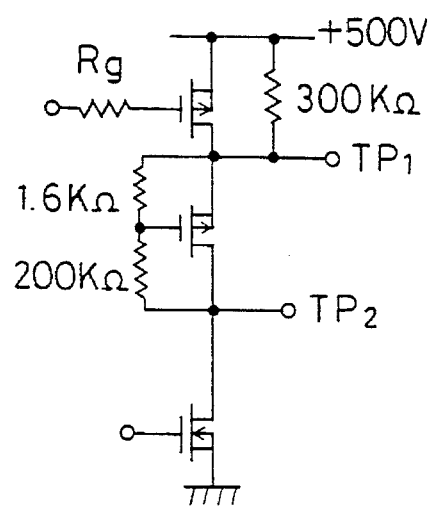
FIG.33
FIG.34(a)
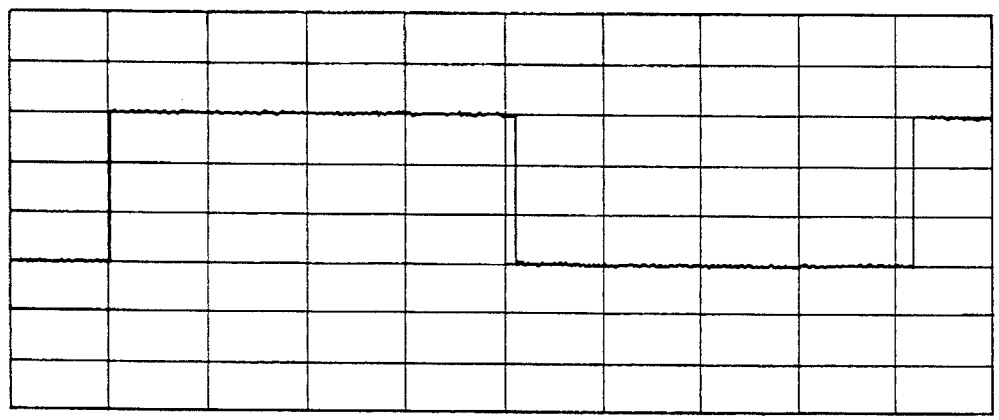
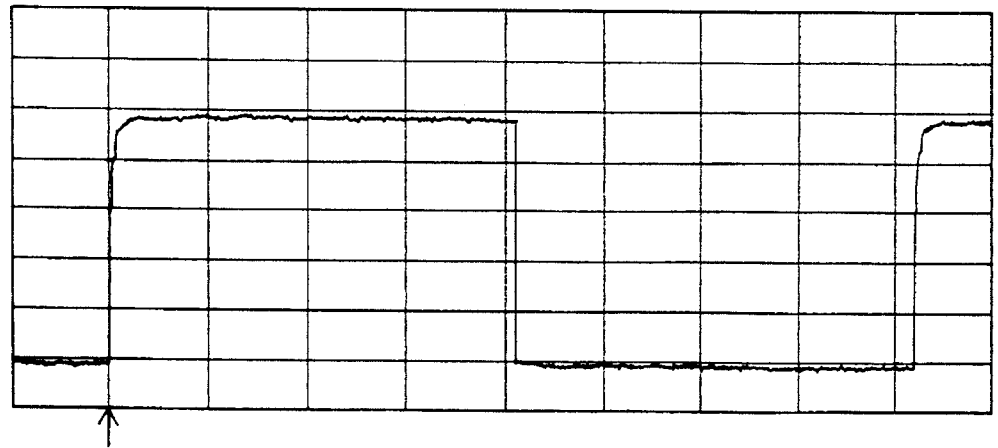
FIG.34(b)

HALFTONE IMAGE DEVICE AND ITS DRIVING CIRCUIT

This is a divisional of copending application Ser. No. 08/007,143 filed on Jan. 21, 1993.

BACKGROUND OF THE INVENTION

The present invention relates to halftone image recording hardware for controlling a charge flow such as an ion flow for recording halftone images and to a high voltage-resistant circuit that enables such recording hardware to work at high speed.

Some proposals have so far been made of a slit control type of image recorder harnessing corotron discharge in which ions generated by corotron discharge are introduced in a slit and the resulting ion flow is controlled by varying an electric field within the slit wall to form a charge pattern on a recording medium, an aperture control type of image recorder making use of corotron discharge in which ions generated by the corotron are passed through apertures in two control electrodes while controlling an electric field between. The resulting ion flow that goes toward a recording medium is placed under on-off control to form a charge pattern on the recording medium. An aperture control type of image recorder harnesses solid discharge in which high-frequency voltage is applied between electrodes with an insulator located between them to induce discharge, and the resulting ions are selectively drawn by electric field control to form a charge pattern on a recording medium.

In accordance with the image recorders harnessing such an ion flow, the ion flow is constricted by reducing the magnitude of the electric field between the ion flow-control electrodes, making the resulting dot diameter small and, at the same time, giving rise to dot density variations. On the other hand, as the magnitude of the electric field between the electrodes controlling the ion flow increases, there is an increase in the diameter of the ion flow, which concurs with dot density variations. In either case, it is possible to form halftone images by inter-electrode field control. Alternatively, when the application time of the electric field is varied while the magnitude of the electric field between the ion flow-controlling electrodes remains constant, the quantity of charges formed on the recording medium varies and so there is a change in the degree of distortion of the electric field by these charges. Consequently, the resulting latent image potential increases with a dot diameter increase. Here, too, it is possible to form halftone images.

When forming halftone images with a controlled ion flow, it is structurally very difficult to control applied voltage, thereby varying the intensity of the electric field between the control electrodes, because the voltage applied to the electrode for ion flow control is as high as a few hundred volts. By contrast, it is structurally easy to control the voltage-applying time while the voltage applied to the control electrodes remains constant, because this is achieved by making use of pulse width modulation techniques. For this reason, a proposal has been made of image recording hardware making use of such halftone reproduction methods (see JP-A-60-175062 and 61-228771).

Incidentally, when it is intended to carry out halftone reproduction by pulse width control modulation with an aperture control type of image recorder that harnesses solid discharge, the magnitude of latent image potential changes stepwise rather than linearly. This phenomenon will now be explained with reference to FIGS. 1 to 3.

FIG. 1 is a representation for illustrating an aperture control type of image recorder that makes use of solid discharge and is driven by alternating currents.

A recording head shown generally at 1 is built up of a line electrode 1b and an insulator 1c stacked on an insulator 1a in this order. A central aperture is defined by a finger electrode 1d, an insulator 1e and a screen electrode 1f, and a high-frequency power source 5 is connected between the line and finger electrodes 1b and 1d. A signal source 6 is connected between the finger and screen electrodes 1d and 1f for the application of signal voltage. An insulating, recording member 2 provided with an electrode 3 is located in opposition to the recording head 1, and a direct-current power source E is connected between the recording head 1 and the recording member for ion flow acceleration.

This image recorder works as follows. Ion generation is induced by intra-head discharge caused by the application of a high-frequency voltage of a few KV to a few MHz between the line and finger electrodes 1b and 1d. A flow of the resulting ions is controlled in dependence on signal voltage between the finger and screen electrodes 1d and 1f. This signal voltage or, in other words, a pulse width modulation signal is then varied in terms of width t in dependence on signal strength, as shown in FIG. 2 with TO representing the maximum signal width, whereby an electrostatic latent image having halftones is formed on the recording member.

When such a signal of modulated pulse width is furnished to the recording head 1, the potential on the surface of the recording member varies with respect to a pulse width change in a stepwise form, as shown in FIG. 3; in other words, its variation is neither linear nor smooth. To see this, such a sine wave as shown in FIG. 4(a) was used as the high-frequency voltage to the recording head to measure the resulting ion flow. As a result, it was found that, as shown in FIG. 4(b), it is only at the peak of the high-frequency voltage that the ion flow can be detected or, to put it another way, the resulting ion flow is discrete. Even when there was a pulse width change between t1 and t2 that define the positions at which an ion flow is to occur., as shown in FIG. 4(c), there was neither any ion flow nor any change in the surface potential of the recording member—this was true of even when there was a pulse width change. In addition, the moment the pulse width exceeded t2 slightly, there was an ion flow increase, making the surface potential variable in a stepwise form and so making it difficult to obtain variable or high contrast.

So far, the formation of halftone images by use of an ion flow control type of image recorder has relied on voltage amplitude, pulse width or sawtooth wave modulation, but a problem with achieving high-speed driving and high contrast relates to how many halftones are attained for a certain time. That is to say, the determination of what driving speed is applied permits the determination of the time τ needed to print one dot. For instance, halftone control must be achieved at a time τ, when it is intended to reproduce 256 halftones. In this regard, low-speed driving offers no problem, but it is still very difficult to achieve high-contrast expression in the case of high-speed driving. For hardware such an ion printer that works at a few hundred volts, a voltage amplifier circuit of high input impedance and excellent in linearity is usually used so as to amplify halftone image data to a predetermined voltage, and a variety of D-A converters such as those of the resistance and integral types are used as well. However, use of an ordinary voltage amplifier circuit makes it difficult to obtain high voltage as high as a few hundred volts, resulting in some considerable expense. It is also difficult to obtain high-voltage and high-speed outputs having rectangular waves, because the through-rate of the voltage amplifier circuit is not very high. For instance, in the case of a transistor element allowed to have an amplification action, the degree of amplification may be increased by making loading resistance large and current consumption small, but there is a driving speed drop. On the other hand, higher driving speed may be achieved by decreasing loading resistance, but current consumption may be increased with a decrease in the degree of amplification. In short, no tradeoff is achieved between high-speed and low consumption power. In the case of capacitive loading, it is only at a waveform rise or fall time that the output current flows, but currents through loading resistance and transistor elements flow constantly at a high output level, incurring a power consumption increase.

The D-A converters, when built up of ICs, unexceptionally produce only low-voltage output. In addition, when it is intended to set up discrete circuits, such problems as mentioned above arise, usually because of the need of using a voltage amplifier circuit. Conventional or ordinary D-A converters, because of being designed to obtain a continuous form of output, do not lend themselves to ion printers, plasma displays, and so on, for which a discrete, high-voltage rectangular waveform of pulses must be produced. In addition, circuits for driving ion printers, plasma displays, and so on are presumed to work in the form of a parallel array of many identical circuits. To achieve this, however, lower power and lower cost are needed.

Besides, driving circuits with built-in FETs are available for driving ion printers, etc.

FIG. 5 is an illustration of a typical driving circuit using a complementary FET. As illustrated, an N-channel FET 11 and a P-channel FET 12 are connected in series, and 0 V and 15 V, for instance, are added to this series circuit as gate input. Connected to the gate of P-channel FET 12 is a level shifter 13 for converting 0 or 15 V to the on-off control signal level of P-channel FET 12. Then, 0 V and 15 V are alternately fed to the gates of N-channel FET 11 and P-channel FET 12 to put them on and off to achieve low and high-level outputs.

FIGS. 6(a) and 6(b) are illustrations of typical driving circuits using resistance loading. As illustrated in FIG. 6(a), a resistance R is connected to the drain side of an N-channel FET 14. At a gate input of 15 V, FET 14 is put on to produce nothing, whereas at a gate input of 0 V, FET 14 is put off to produce low- and high-level outputs.

FIG. 7 is a typical representation of a totem pole combination of N-channel FETs, in which a buffer is provided to a resistance load type of circuit shown by a broken line in FIG. 6(a). With this circuit, it is possible to obtain a large output current by a buffer 18 and to achieve a sharp rise as well.

FIG. 8 is an illustration of a typical high voltage-resistant driving circuit built up of a series combination of low voltage-resistant P-channel FETs 20 and 21. This circuit is designed to work such that putting P-channel FET 21 off causes P-channel FET 20 to be off, and putting P-channel FET 21 on gives rise to putting P-channel FET 20 on. This circuit is allowed to withstand high voltage because of a series combination of P-channel FETs 20 and 21.

Illustrated in FIG. 5 is a basic driving circuit, but this is unsuitable for a high-voltage driving circuit, because much difficulty is now involved in procuring P-channel FETs having a voltage resistance of 300 V or higher.

The circuit of FIG. 6(a) can work at high speed and at an output waveform fall time, but its rise characteristics are generally not good, because it depends on the value of resistance R and output load, as shown in FIG. 6(b). When the value of R is reduced so as to improve its rise characteristics, there is a current increase when N-channel FET 14 is put on, resulting in a power consumption increase.

The circuit of FIG. 7 is favorable for large capacity loading, but a similar problem as in the resistance loading type circuits of FIGS. 6(a) and 6(b) arises under a capacitive load almost similar to the gate input capacity of an FET. In short, the value of resistance R must be reduced so as to allow N-channel FET 17 to work at high speed, but this results in a power consumption increase.

The circuit of FIG. 8 may be made high-resistant to voltage, because of being built up of a series combination of P-channel FETs, but it cannot work at high speed due to a time constant ascribable to resistance R and the capacities of the FETs. When the value of R is reduced so as to achieve high-speed performance, there is a current increase when N-channel FET 19 is put on, as in the circuits of FIGS. 6(a) and 6(b) only to give rise to a power consumption increase.

SUMMARY OF THE INVENTION

An object of the invention is to provide a halftone image recorder apparatus that makes good-quality halftone reproduction feasible.

Another object of the invention is to provide an aperture control type of image recorder apparatus by alternating-current driven solid discharge, which can be used to smooth a surface potential change in a recording member with respect to pulse width, thereby achieving good-quality halftone reproduction.

A further object of the invention is to provide an ion flow control type of image recorder system that enables high-speed driving and high-contrast expression to be achieved.

A still further object of the invention is to provide a voltage modulation circuit that is small in the number of the parts involved and low in power consumption and fabrication cost, and can produce a high-voltage, high-speed rectangular waveform of pulses.

A still further object of the invention is to provide a high voltage-resistant driving circuit for capacitive loading that makes use of a low voltage-resistant P-channel FET, that can work at high speed and that enables driving voltage to be boosted.

A halftone image recorder apparatus of the invention, which includes an alternating-current driving recording head for forming a charge pattern defined by a charge flow on a recording medium and a waveform conversion circuit for modulating the pulse width of signal voltage applied to the recording head in dependence on the density level of the image to be recorded and in which the dot diameter of the charge pattern formed is controlled by modulating the pulse width of the signal voltage applied to the recording head, is characterized in that said waveform conversion circuit is designed to convert the signal voltage to a waveform with a time constant imparted to at least one of the leading and trailing edges of the pulse width-modulated signal.

Another halftone image recorder apparatus of the invention is characterized by including a recording head for forming a charge pattern by a charge flow on a recording medium and a waveform conversion circuit for modulating the amplitude and width of pulse voltage applied to the recording head in dependence on the density level of the image to be recorded, and in that said waveform conversion circuit produces a pulse comprising an amplitude-modulated part and a pulse width-modulated part that are independently separate from each other.

The invention is further characterized in that the pulse width of the pulse width-modulated part is stepwise varied using the pulse width of the amplitude-modulated part as a unit width, said unit width, in the case of an ion flow-generating head, being equal to an integral multiple of one ion-generation cycle.

The present invention provides a voltage modulation circuit for converting discontinuously fed input data to voltage signals for output, characterized by comprising a voltage signal-generation circuit for generating voltage signals corresponding to the input data, a reset circuit for resetting the resultant voltage at a predetermined timing, a pulse voltage-superposition circuit for superposing pulse voltages of opposite phases on the resultant voltage signals, and a switching circuit that comprises a series combination of P- and N-channel MOSFETs, provided for applying two voltage signals with pulse voltages of opposite phases superposed on them to the gate and source electrodes of the N- or P-channel MOSFET by way of a buffer, and controlled such that when the N- or P-channel MOSFET is held off, the P- or N-channel MOSFET is put on.

The present invention also provides a voltage modulation circuit for converting discontinuously fed input data to voltage signals for output, characterized by comprising first and second voltage signal-generation circuits for generating voltage signals corresponding to the respective input data, first and second reset circuits for resetting the resultant first and second voltages at predetermined timings, first and second pulse voltage-superposition circuits for superposing pulse voltages of opposite phases on the resultant first and second voltage signals, and a switching circuit that comprises a series combination of P- and N-channel MOSFETs, and characterized in that two voltage signals with pulse voltages of opposite phases superposed on the first voltage signal are applied in the form of switching signals to the gate and source electrodes of the N- or P-channel MOSFET by way of a first buffer, and two voltage signals with pulse voltages of opposite phases superposed on the second voltage signal are applied in the form of switching signals to the gate and source electrodes of the N- or P-channel MOSFET by way of a second buffer.

Further, the invention is characterized in that the voltage signal-generation circuit and the pulse voltage-superposition circuit each comprise two coupling capacitors connected to a constant-current circuit, and pulse voltages of opposite phases are applied to said two coupling capacitors.

Still further, the invention is characterized in that a plurality of constant-current circuits are provided for feeding constant currents to the coupling capacitors to weight the current values of the respective constant-current circuits.

Still further, the invention is characterized in that a source- or emitter-follower circuit is connected to the output of the switching circuit.

Furthermore, the present invention provides a complementary driving circuit that comprises a series combination of P- and N-channel FET driving elements and alternately places them under on-off control to drive a capacitive load, characterized in that a resistance is connected between the source and drain of at least one of the P- and N-channel FET driving elements, and at least one equivalent two-terminal element is connected between said FET driving elements and in series to at least one of the FET driving elements, said equivalent two-terminal element being put on with a current of a certain or higher value passing therethrough to show constant-voltage characteristics and put off with a current of a certain or lesser value passing threrethrough to give a constant resistance.

In addition, the invention is characterized in that the equivalent two-terminal element is made up of an FET with resistances connected between the drain and gate and the gate and source, respectively, a gas-filled discharge tube with a resistance connected in parallel therewith, or a constant-voltage diode with a resistance connected in parallel therewith.

BRIEF DESCRIPTION OF THE DRAWINGS

FIGS. 9(a) and 9(b) represent pulse width-modulated signal waveforms with a time constant imparted to the trailing edge, FIGS. 10(a) and 10(b) represent pulse width-modulated signal waveforms with a time constant imparted to the leading edge, FIGS. 12(a) through 12(c) illustrate embodiments of a waveform conversion circuit, FIGS. 13(a) through 13(f) illustrate other embodiments of the waveform conversion circuits, FIGS. 31(a) and 13(b) illustrate a basic construction of a driving circuit, FIG. 33 represents an illustrative circuit diagram for obtaining an output voltage waveform, FIGS. 34(a) and 34(b) are a rough representation of a voltage waveform.

DESCRIPTION OF THE PREFERRED EMBODIMENTS

One embodiment of the halftone image recorder according to the invention will now be explained with reference to FIGS. 9–18.

This embodiment is characterized by imparting a time constant to at least one of the leading and trailing edges of a pulse width-modulated signal applied to a recording head. For instance, signals 30 and 31 that are pulse-widthwise modulated in correspondence to image signals are converted to signals 32 and 33 of a waveform with a time constant imparted to the trailing edge through a waveform conversion circuit to be described later, as illustrated in FIGS. 9(a) and 9(b).

Figures 11A, 11B:
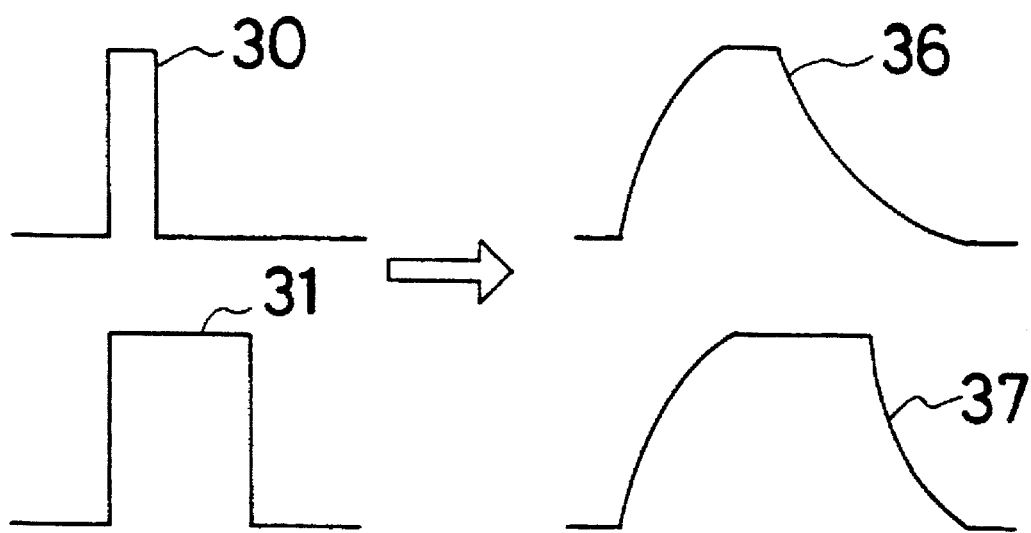
FIGS. 11(a) and 11(b) represent pulse width-modulated signal waveforms with time constants imparted to the leading and trailing edges.

In FIGS. 10(a) and 10(b) signals 30 and 31 that are pulse-widthwise modulated in correspondence to image signals are converted to signals 34 and 35 of a waveform with a time constant imparted to the leading edge, and in FIGS. 11(a) and 11(b), signals 30 and 31 that are pulse-widthwise modulated in correspondence to image signals are converted to signals 36 and 37 of a waveform with time constants imparted to the trailing and leading edges.

Signals 32 and 33 having the waveform of FIGS. 9(a) and 9(b) are obtained by subjecting the output of a signal power source 43 that generates a pulse width-modulated signal to waveform conversion through a waveform conversion circuit 40, as shown in FIG. 12(a). Waveform conversion circuit 40 is built up of switches S1 and S2, a resistance R1 and a capacitor C, and is designed such that switches S1 and S2 are respectively closed and opened at a pulse rise time to apply a pulse voltage to capacitor C, and switches S1 and S2 are respectively opened and closed at a pulse fall time for discharge by a time constant circuit defined by capacitor C and resistance R1. It is noted that this may be achieved by the mere application of the point of contact of switch S1 with resistance R1 to the electrode of the recording head.

Waveform signals of FIGS. 10(a) and 10(b) are obtained by a waveform conversion circuit 41 shown in FIG. 12(b). In waveform conversion circuit 41, switches S1 and S2 are respectively closed and opened at a pulse rise time, so that a time constant can be obtained by a time constant circuit comprising resistance R1 and capacitor C. At a pulse fall time, on the other hand, switches S1 and S2 are respectively opened and closed, so that capacitor C can be short-circuited and so is instantaneously discharged and then drops to ground potential.

Waveform signals 36 and 37 of FIGS. 11(a) and 11(b) are obtained by a waveform conversion circuit 42. In waveform conversion circuit 42, switches S1 and S2 are respectively closed and opened at a pulse rise time, so that a time constant can be provided by a charging curve due to a time constant circuit comprising resistance R2 and capacitor C At a pulse fall time, on the other hand, switches S1 and S2 are respectively opened and closed, so that a time constant can be provided by a charging curve due to a time constant circuit comprising capacitor C and resistances R1 and R2.

As regards FIG. 10(b) and 11(b) wherein the time constants are imparted to the leading edges, the pulse peak value has been described as being approximately reached for a given time. Strictly speaking, however, some considerable time is needed until a constant voltage is reached. Therefore, in order to achieve a constant voltage for a given time, as shown, it is required to open switch S1 at that time—in which case switch S2 is held open, thereby holding that peak by capacitor C. It is noted that these switches S1 and S2 may be placed under preprogrammed control by making use of a microcomputer, etc.

It is understood that the driving waveforms of the instant embodiment are not limited to those having such time constants as shown in FIGS. 9(a), 9(b), 10(a), 10(b), 11(a) and 11(b); in other words, they may go up or down linearly. For instance, if the resistance in the conversion circuit shown in FIGS. 12(a) through 12(c) is replaced with a constant-current circuit, it is then possible to obtain such a trapezoidal waveform as shown in FIGS. 13(a) through 13(f).

FIG. 13(a) represents an arrangement in which a constant-current circuit I1 is built in the discharge circuit, thereby obtaining a linearly increasing waveform such as on shown in FIG. 13(b). FIG. 13(c) represents an arrangement wherein a constant-current circuit 12 is incorporated in the charging circuit, thereby obtaining a linearly increasing waveform such as on shown in FIG. 13(d). FIG. 13(e) illustrates an arrangement wherein constant-current circuits are built in the charging and discharging circuits, thereby obtaining a waveform that goes up linearly and, after a constant voltage is reached, goes down linearly, such as one shown in FIG. 13(f).

Figure 14A:
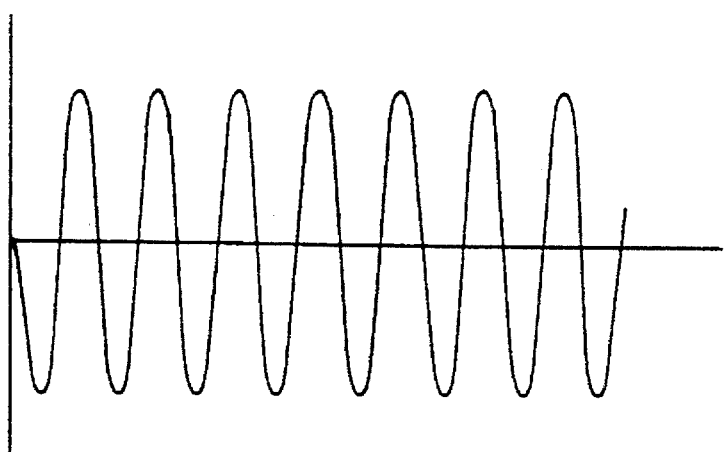
FIGS. 14(a) through 14(c) illustrate the principle of halftone expression according to the invention.
Figure 14B:
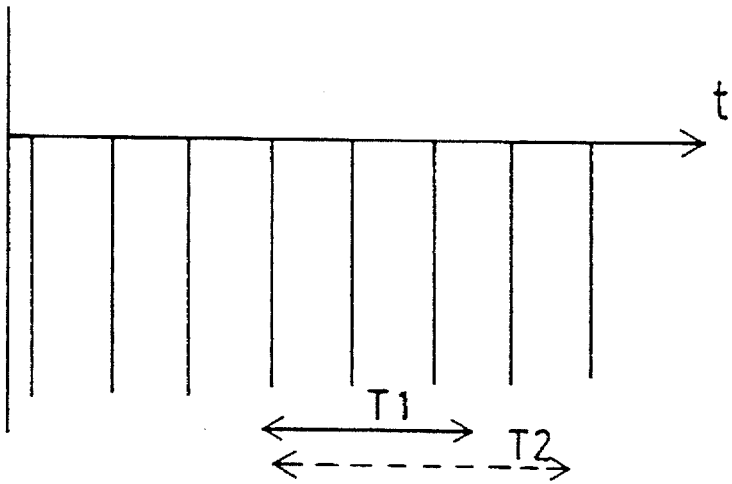
Figure 14C:
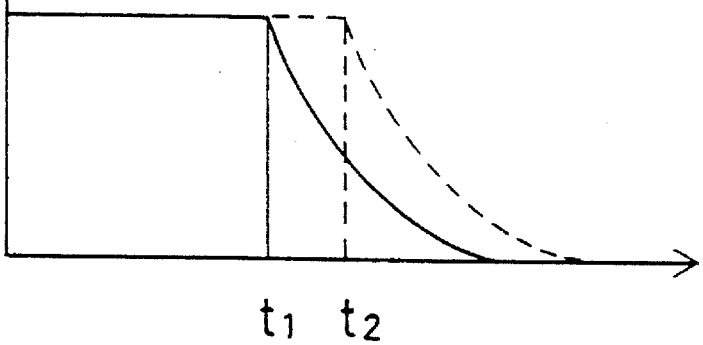

Then, reference will be made to the case where, for instance, a signal that is pulse-widthwise modulated in correspondence to an image signal is subjected to waveform conversion to give a time constant to the trailing edge. Even when there are discrete ion flows, as shown in FIG. 14(b), that are generated by a high-frequency voltage such as one shown in FIG. 14(a), the presence of the time constant shown in FIG. 14(c) permits the discretely generated ion flow to be accepted at a time period T1 or T2. Because this gives rise to a change in an ion current that makes some contribution, even when there is a pulse width change between t1 and t2, surface potential changes approximately linearly (smoothly) in dependence on pulse width but without undergoing a stepwise change.

Figure 15A:
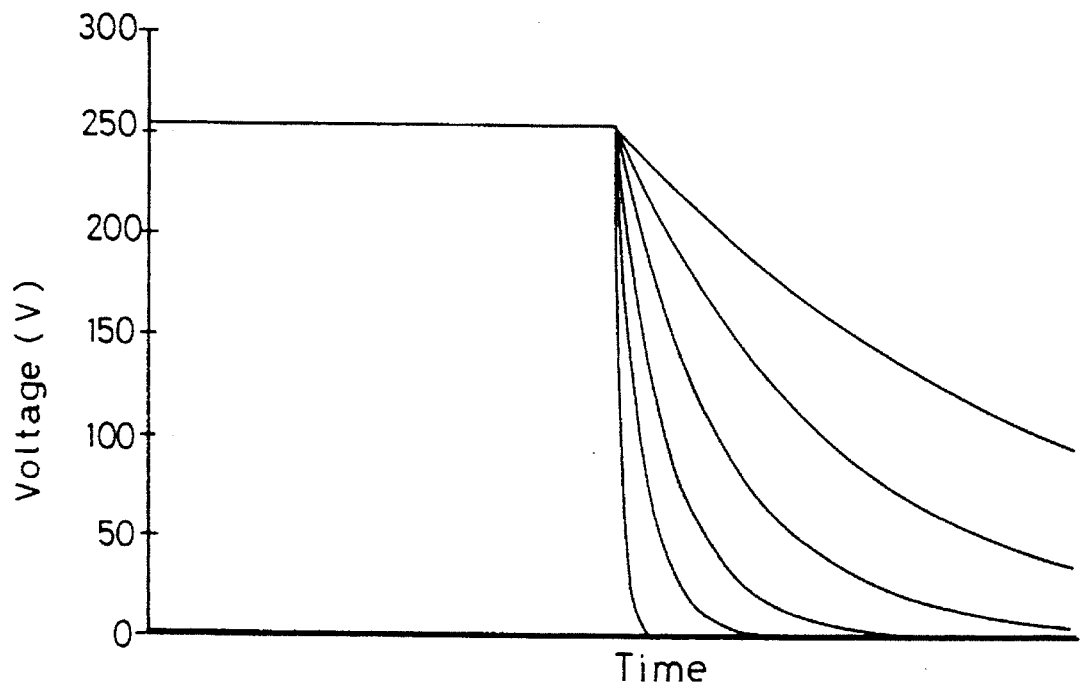
FIGS. 15(a) and 15(b) represent a waveform with time constants imparted to the trailing edge and surface potential obtained when this waveform is used.
Figure 15B:
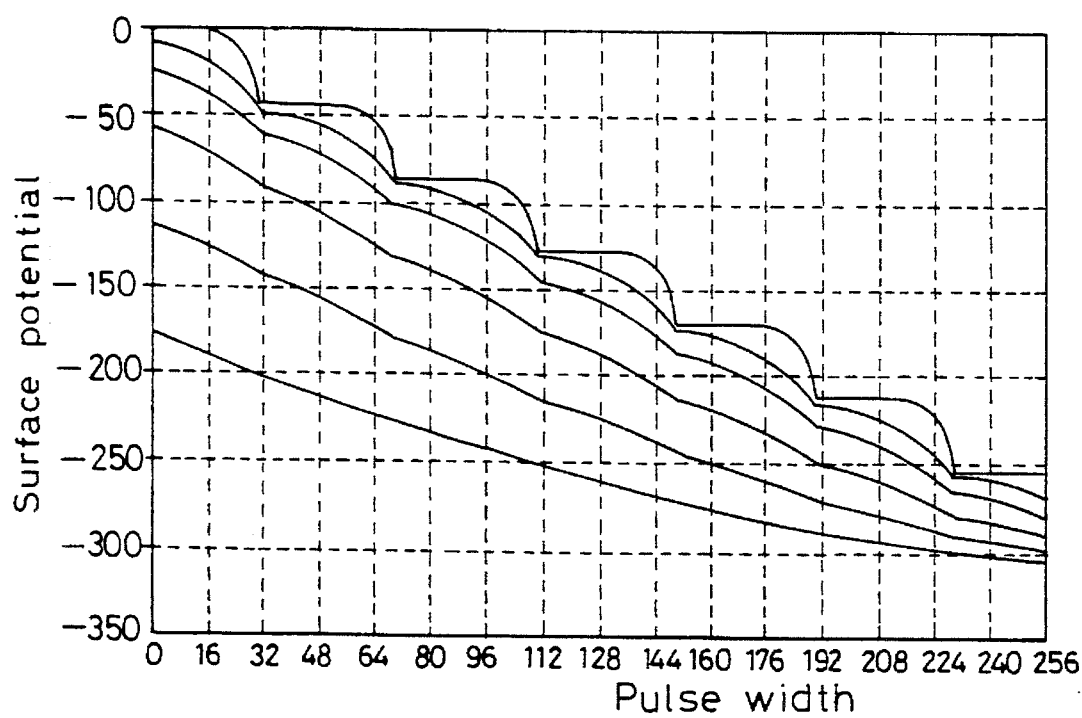

For instance, this will be explained with reference to the results of simulation shown in FIGS. 15(a), 15(b), 16(a) and 16(b). In this simulation, varying time constant values were imparted to the trailing edge of a rectangular wave, as shown in FIG. 15(a), to detect surface potentials. Such results as shown in FIG. 15(b) were obtained. In FIG. 15(a), as the time constant of the trailing edge increases, the surface potential obtained in FIG. 15(b) changes from a stepwise curve to a smoothly changing curve. It is thus understood that the suitable choice of a suitable time constant value enables good-quality halftone reproduction to be achieved, because a change of surface potential with respect to pulse width is made smooth.

Figure 16A:
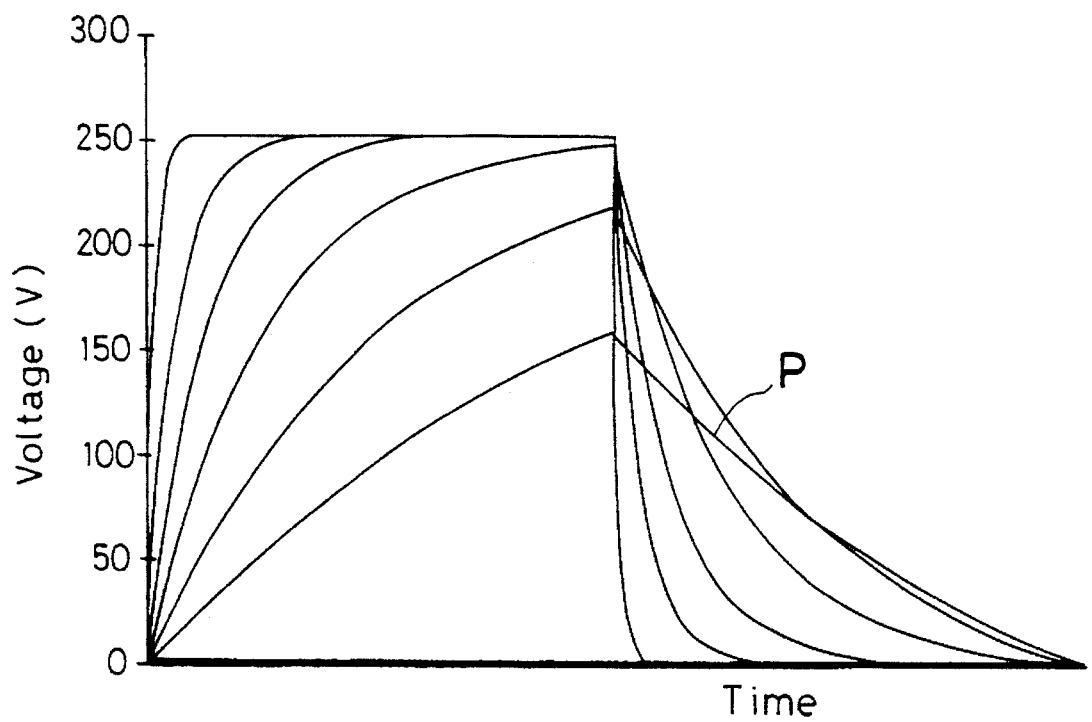
FIGS. 16(a) and 16(b) represent another waveform with time constants imparted to the leading and trailing edges and surface potential obtained when this waveform is used.
Figure 16B:
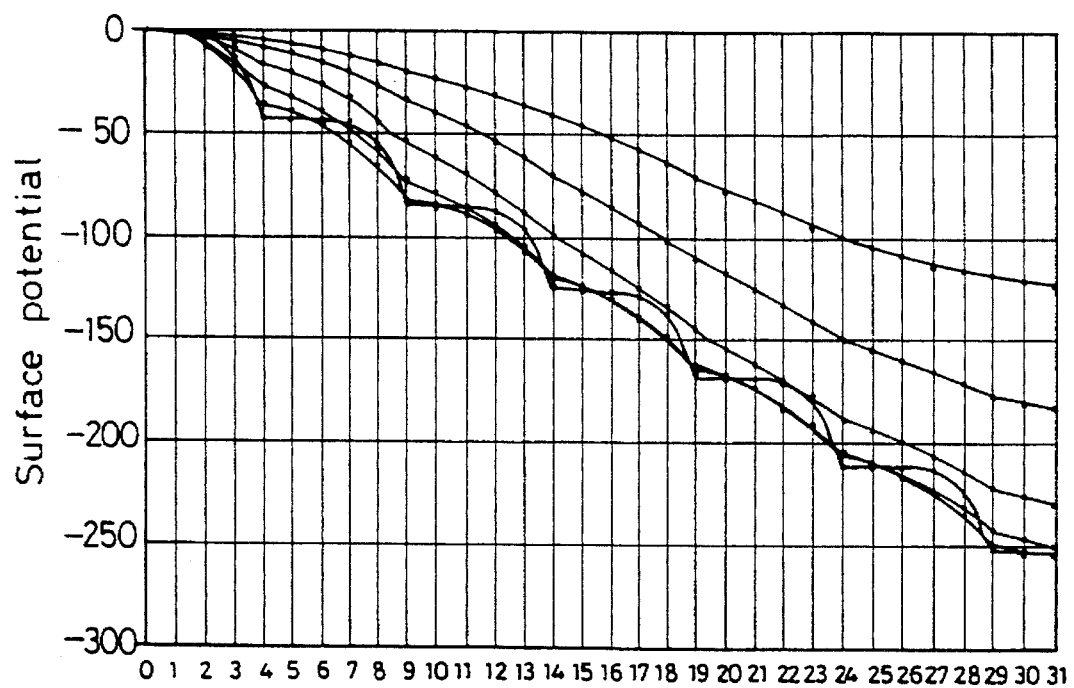

FIG. 16(a) represents the case where time constants are imparted to the leading and trailing edges of a rectangular wave. In the case of a waveform P, there is obtained a triangular wave that has an increased time constant but is free from any constant-voltage part. As can be seen from FIG. 16(b), there is a stepwise change of surface potential with respect to pulse width as long as the time constant is small, but that surface potential changes smoothly, as the wave approximates to a triangular waveform with increases in the time constants imparted to the leading and trailing edges.

Figure 17:
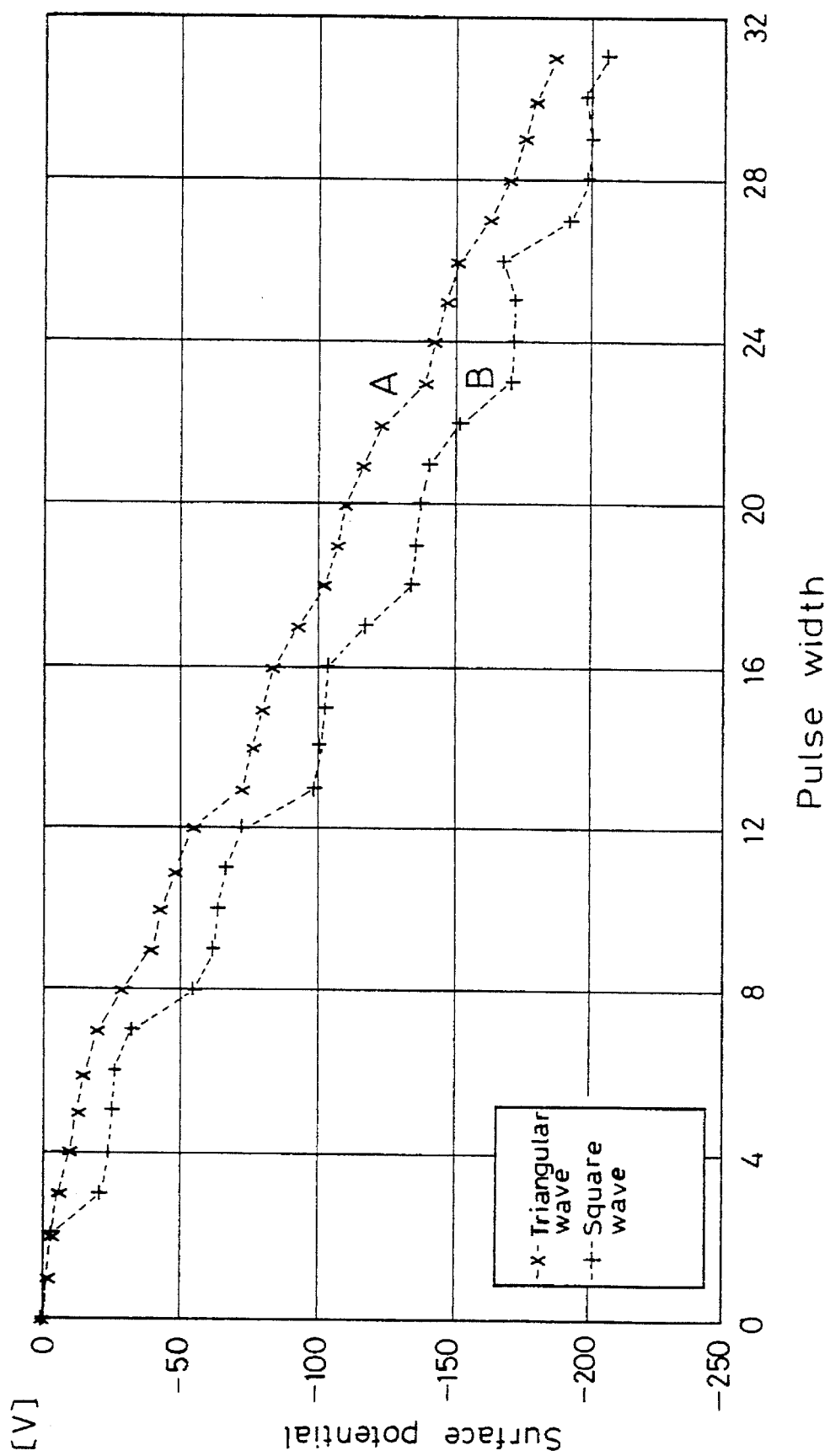
FIG. 17 represents the relation between pulse width and surface potential when triangular and square waves are used.
Figure 18:
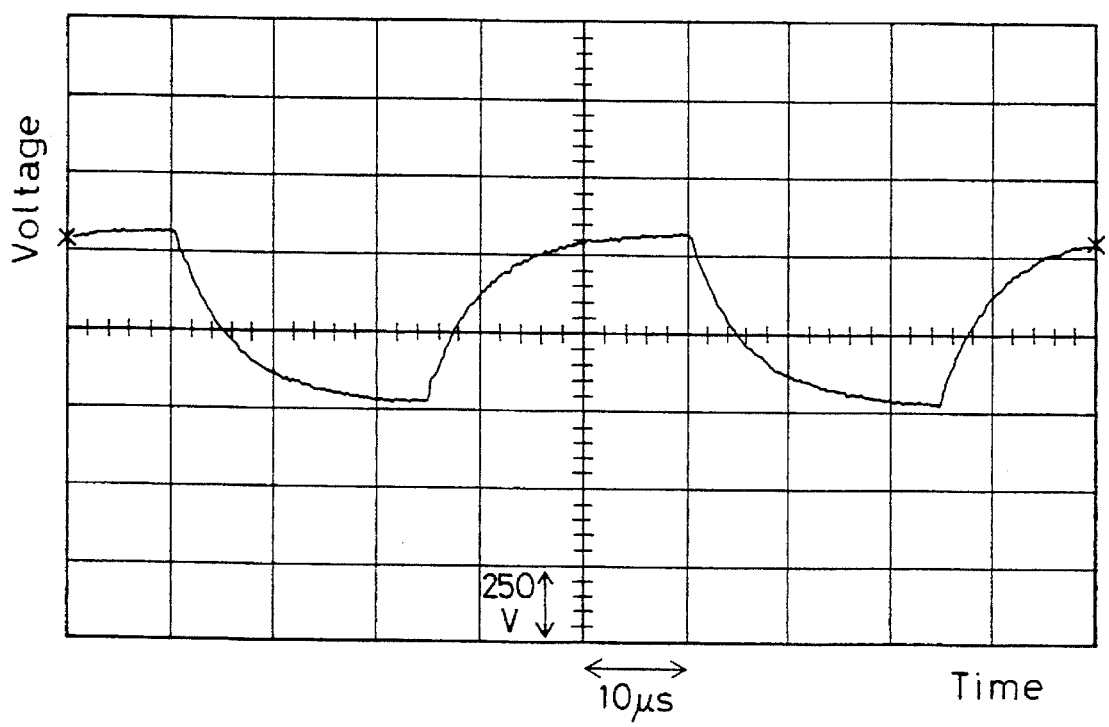
FIG. 18 represents a triangular wave with time constants imparted to the leading and trailing edges.

The changes in surface potential with respect to pulse width were measured using a triangular wave (characteristic A) and a square wave (characteristic B). The results are shown in FIG. 17. It is here noted that a wave form comprising charging and discharging curves, as shown in FIG. 18, was used as the triangular wave. As can be understood from FIG. 17, the surface potential change with respect to the pulse width change is smoother in the triangular wave than in the square wave.

According to this embodiment mentioned above, it is possible to obtain high halftone output, because there is no influence by the generation of discrete ion flows that are corresponding to the alternating-current frequency applied to the recording head, and so the change of the surface potential formed on the recording member becomes smooth in correspondence to pulse with.

In the following description, another embodiment of the halftone image recorder according to the invention will be explained.

Figure 19A:
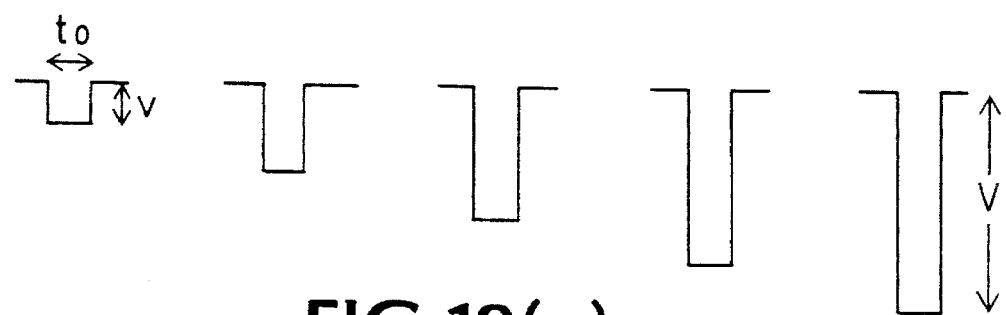
FIGS. 19(a) through 19(c) illustrate one embodiment of a pulse width- and amplitude-modulated signal.
Figure 19B:
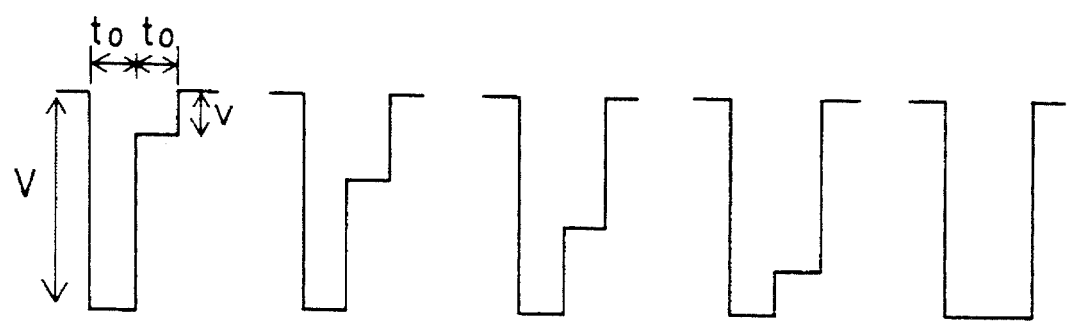
Figure 19C:
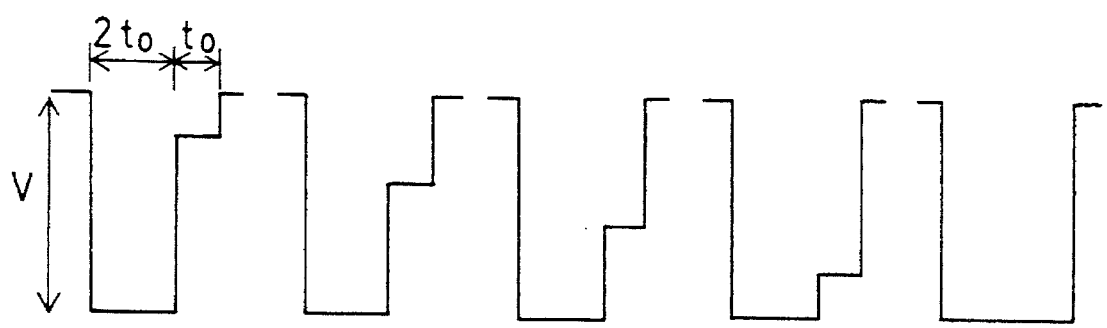

FIGS. 19(a) through 19(c) represent one embodiment of a pulse width- and amplitude-modulated signal. It is noted that this embodiment is applicable to every ion flow control type of image recorder.

As shown in FIG. 19(a), the amplitude of a pulse having a unit time duration $t_0$ in correspondence to the input signal voltage is now changed to an amplitude V at a unit amplitude step v. When the input signal voltage is large, a pulse having a time duration $t_0$ and an amplitude V is shifted in phase by unit time duration $t_0$, as shown in FIG. 19(b). Then, the pulse having unit time duration $t_0$ is likewise changed to amplitude V. When the input signal voltage is larger, a pulse having a time duration $2t_0$ and amplitude V is shifted in phase by unit time duration $t_0$, as shown in FIG. 19(c). Then, the pulse having unit time duration $t_0$ is similarly changed to amplitude V. When the signal voltage is much larger, phase shift is done by unit time duration $t_0$. Then, the pulse having unit time duration $t_0$ is similarly changed to amplitude V at unit amplitude step v. Thus, amplitude modulation is done with a pulse having unit time duration $t_0$ at step v, while pulse width modulation is carried out using time duration $t_0$ as the unit; amplitude and pulse width modulations are done independently from each other.

Now let us call amplitude modulation N halftone control and pulse width modulation M halftone control. We can then define the total halftone in terms of N×M halftones. In this case, the driving speed is determined by either N or M, although the chosen N or M must be larger than the other. Now, if M>N, it is then possible to make the driving speed M times as large. For instance, if N=64 and M=4 in the case of 256-halftone expression, it is then possible to apply the driving speed for 64-halftone expression even to the 256-halftone expression or, in other words, the driving speed can be increased to 4 times as large. If N=M=16, it is then possible to apply the driving speed for 16-halftone expression even to 256-halftone expression or, in other words, the driving speed can be increased to 16 times as large.

It is noted that, in FIGS. 19(a) through 19(c), the amplitude-modulated part of the driving pulse waveform is gradually shifted in phase by $t_0$, as it goes from FIG. 19(a) through FIG. 19(b) to FIG. 19(c). For actual ready control, however, it is preferable to fix the phase of the amplitude-modulated part. For this reason, it is desired to perform such waveform control as shown in FIGS. 10(a) through 20(c)

Figure 20A:
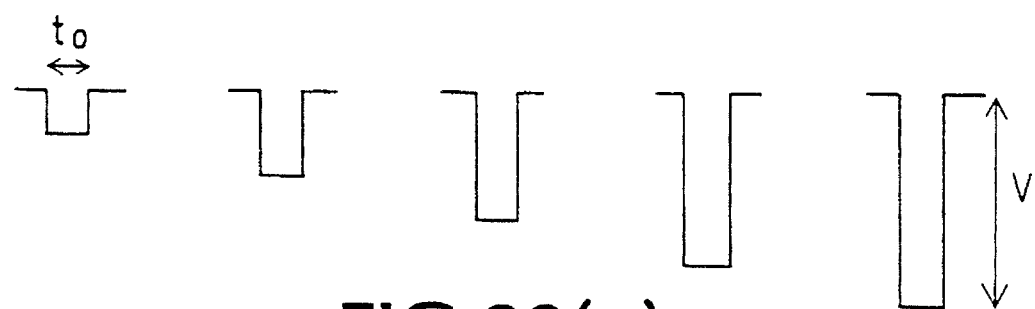
FIG. 20(a) through 20(c) illustrate another embodiment of the pulse width- and amplitude-modulated signal.
Figure 20B:
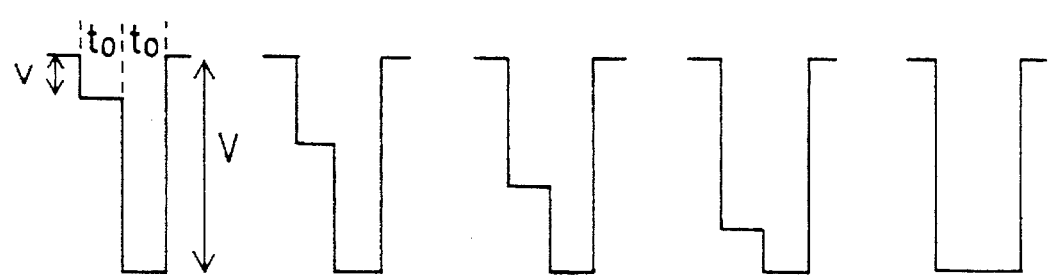
Figure 20C:
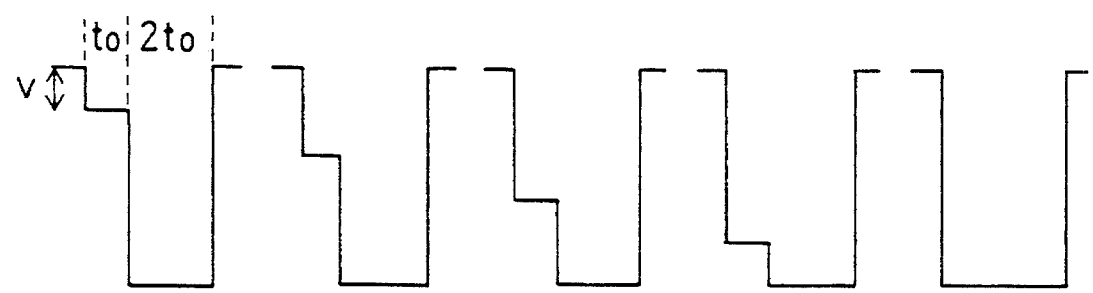

In other words, it is desired that, as shown in FIG. 20(a), the amplitude of the pulse having unit time duration $t_0$ be changed to amplitude V at unit amplitude step v, corresponding to the input signal voltage. When the input signal voltage is larger, a pulse having time duration $t_0$ and amplitude V is shifted in phase by time duration $t_0$, as shown in FIG. 20(b). Then, the pulse having unit time period $t_0$ is likewise changed in the same phase to amplitude V at unit amplitude step v. When the input signal voltage is larger, a pulse having a time durable $2t_0$ and amplitude V is shifted in phase by time duration $t_0$, as shown in FIG. 20(c). Then, the pulse is changed in the same phase to amplitude V at unit amplitude step v. These pulse width- and amplitude-modulations are true of when the input signal voltage is much larger.

With such a pulse waveform, amplitude modulation control is easy to perform, because the phase of the amplitude-modulated part is fixed.

Figure 21:
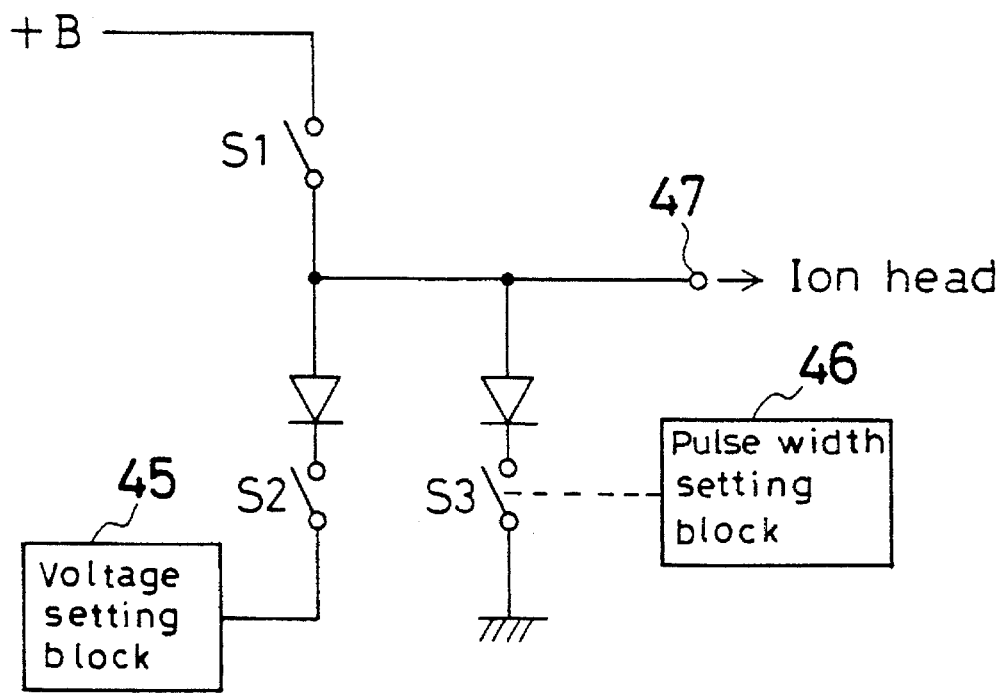
FIG. 21 is a rough representation of one embodiment of a driving circuit.
Figure 22:
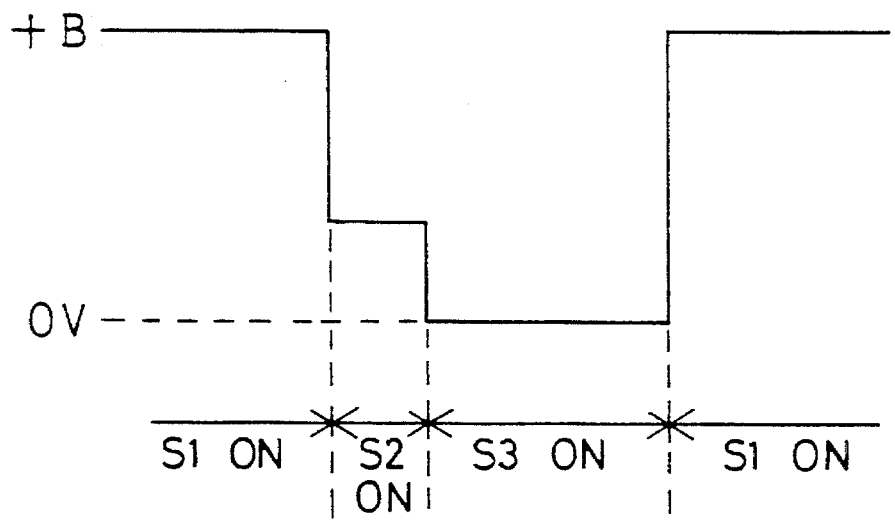
FIG. 22 is a rough representation of how the driving circuit works, FIGS. 23(a) through 23(c) comprise a rough representation of how ion generation occurs, FIGS. 24(a) through 24(b) comprise a conceptional illustration of a corotron type of ion printer.

FIG. 21 illustrates the waveform conversion circuit for generating the pulse waveform shown in FIGS. 20(a) through 29(c), and FIG. 22 is a representation of how the waveform conversion circuit works. In FIG. 21, reference numeral 45 stands for a voltage setting block, 46 a pulse width setting block, 47 an input terminal, and S1–S3 switches.

As already explained in connection with FIGS. 19(a) through 19(c) and 20(a) through 20(c), the voltage setting block produces at a given unit step a plurality of varying voltages that correspond to the number of halftones. The pulse width setting block produces a plurality of pulses having varying widths at a given unit time duration step. When switch S1 is first put on, output terminal 47 acquires a power source +B level. When switch S1 is put off followed by putting switch S2 on, output terminal 47 acquires the output level of voltage setting block 45, and when switch S3 is put on, output terminal 47 becomes zero. Hence, it is possible to generate the modulated pulse that has been explained with reference to FIGS. 20(a) through 20(c) by placing switches S2 and S3 under switching control at the unit time duration and at the unit time duration or a time duration that is an integral multiple thereof. It is then possible to achieve high-speed driving and high-contrast expression by applying such a modulated pulse through output terminal 47 to an ion head.

Figure 1:
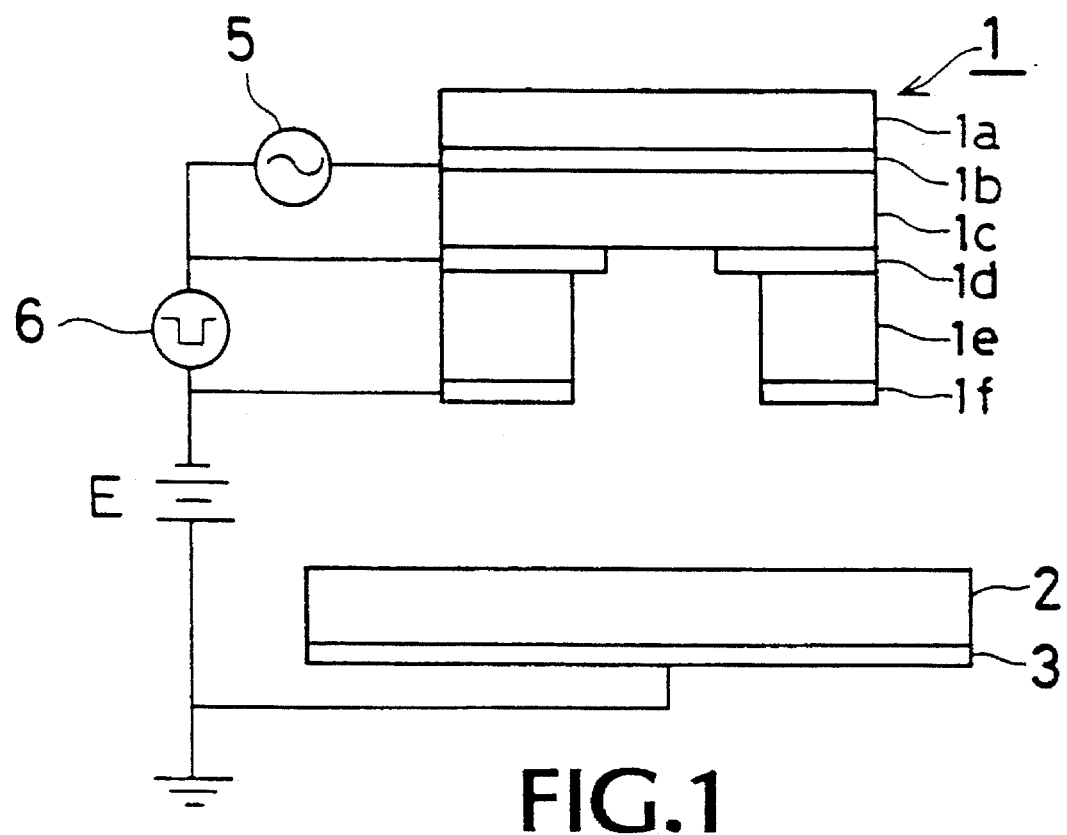
FIG. 1 is a view that illustrates an alternating-current driven, aperture control type of image recorder characterized by solid discharge.
Figure 2:
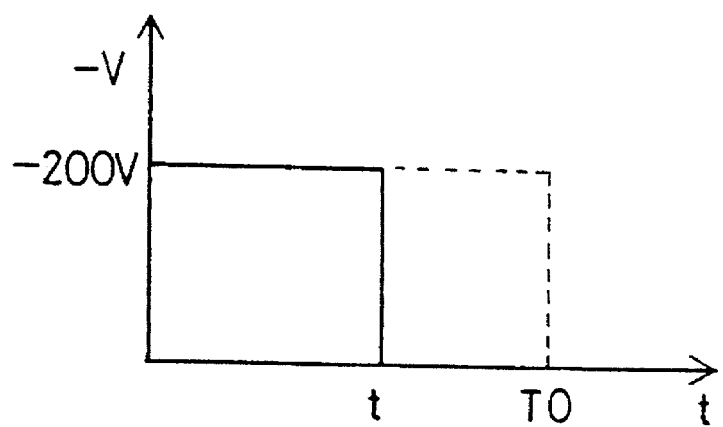
FIG. 2 represents a rectangular pulse width-modulated signal.
Figure 3:
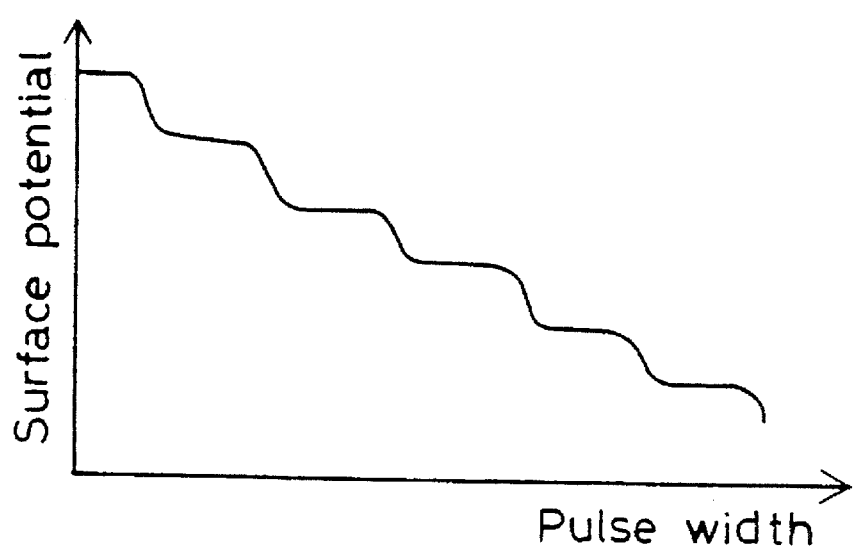
FIG. 3 represents the relation between pulse width and surface potential.
Figure 4A:
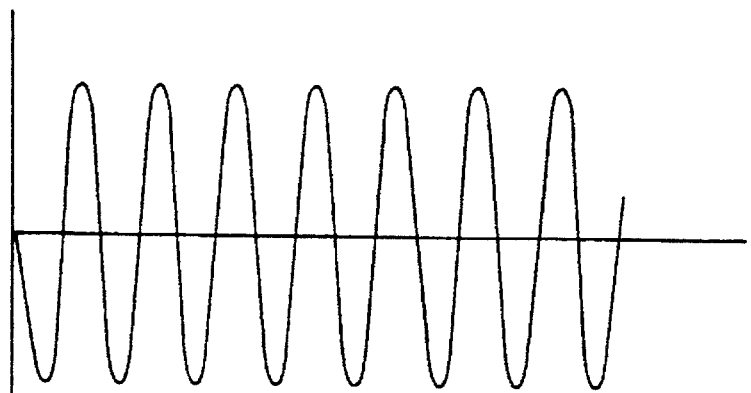
FIGS. 4(a) through 4(c) illustrate the phase relation between high-frequency voltage and rectangular pulse width-modulated signal.
Figure 4B:
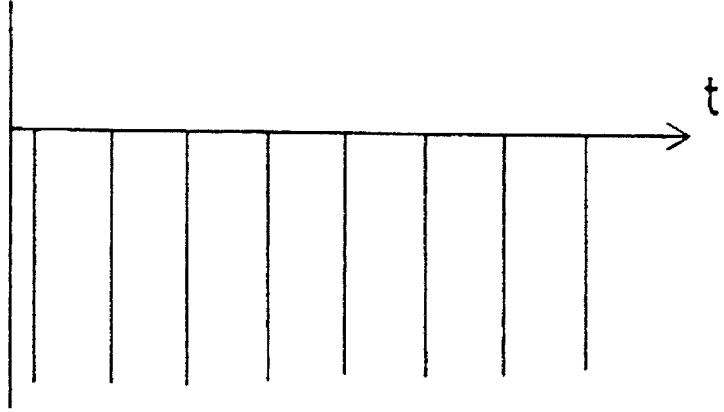
Figure 4C:
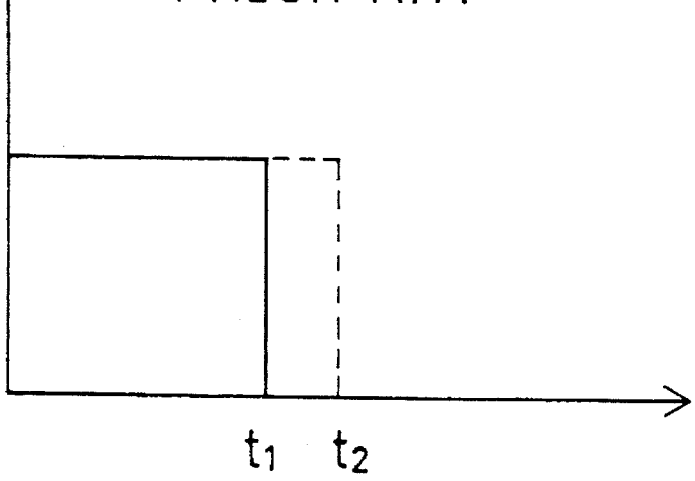
Figure 5:
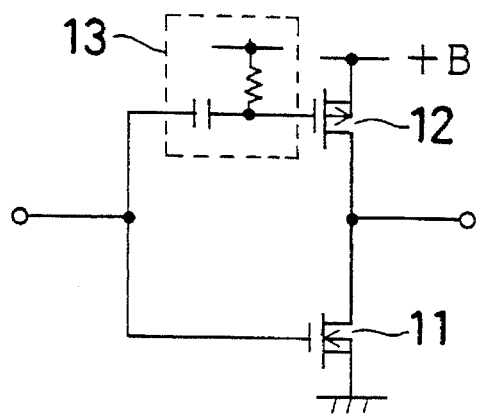
FIG. 5 is a view showing a conventional complementary driving circuit diagram.
Figure 6A:
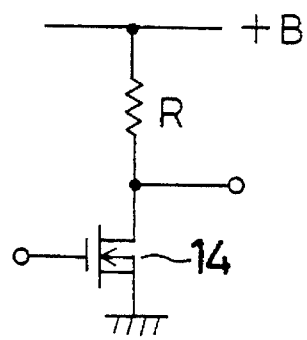
FIGS. 6(a) and 6(b) represent resistance loading type of driving circuit.
Figure 6B:
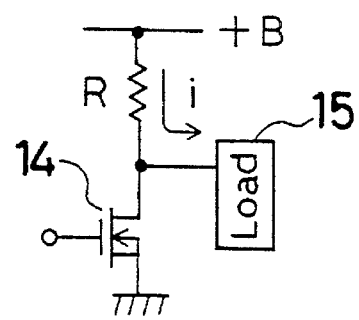
Figure 7:
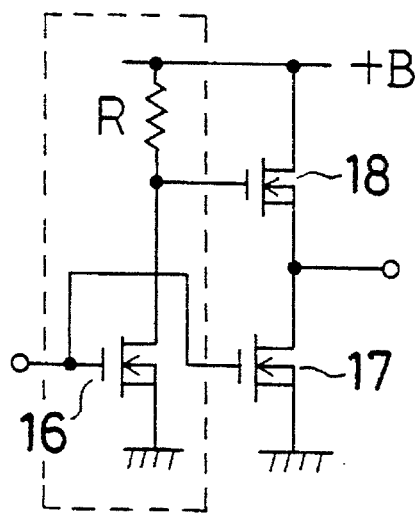
FIG. 7 is a totem pole-connected type of driving circuit diagram.
Figure 8:
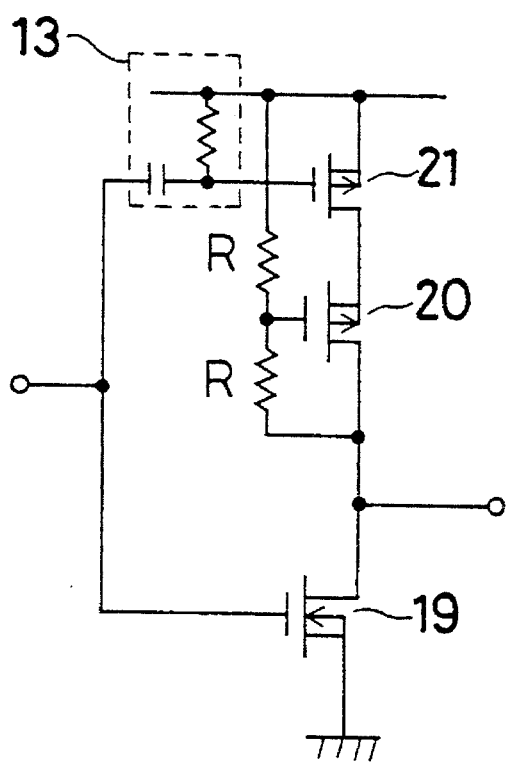
FIG. 8 is a conventional high voltage-resistant driving circuit diagram.
Figure 23A:
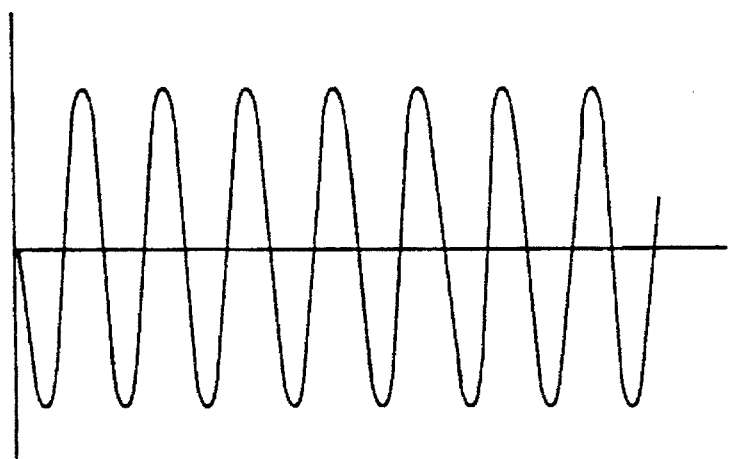
Figure 23B:
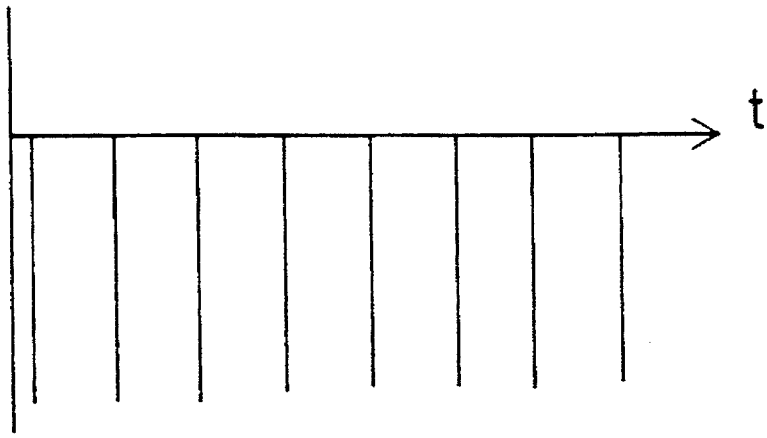
Figure 23C:
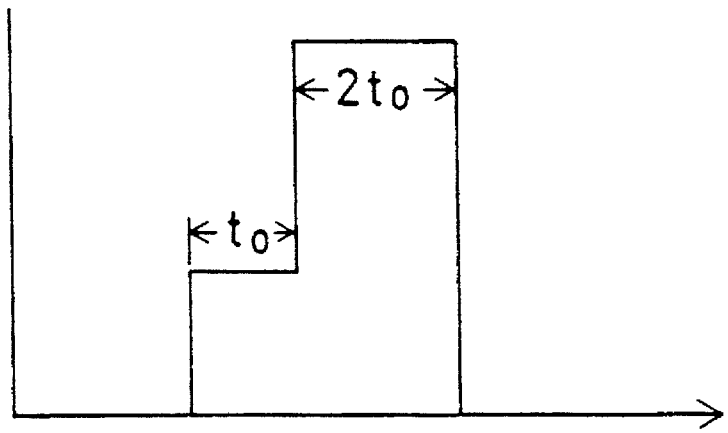

It is here noted that, when such a sine wave as shown in FIG. 23(a) is used as the high-frequency voltage for an aperture control type of halftone image recorder by solid discharge, shown in FIG. 1, ion flows are detectable only at the peak of the high-frequency voltage, as already explained in connection with FIGS. 4(b) and as illustrated in FIG. 23(b). To put it another way, they are discretely generated at a certain period and so there is a variation in the quantity of the ions generated. Hence, if the unit time duration $t_0$ explained with reference to FIGS. 19(a) through 19(c) and 20(a) through 20(c) corresponds to one ion-generation cycle or cycles that are .an integral multiple thereof, it is then possible to generate ion flows in association with a pulse width change.

The instant embodiment, because of making high halftone control easy even when it is driven at high speed, enables printing speed to be increased and good-quality halftone reproduction to be carried out.

While the embodiment mentioned above has been described with respect to the alternating-current drive mode, it is noted that the invention may be carried out on a direct-current ion generation mode.

Figure 24A:
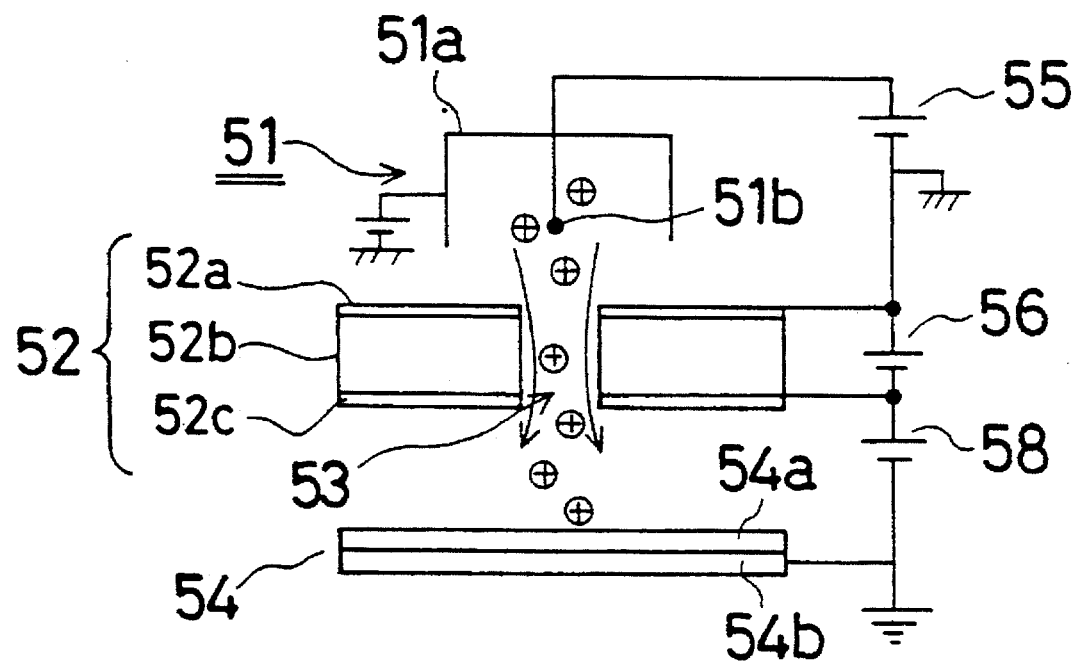
Figure 24B:
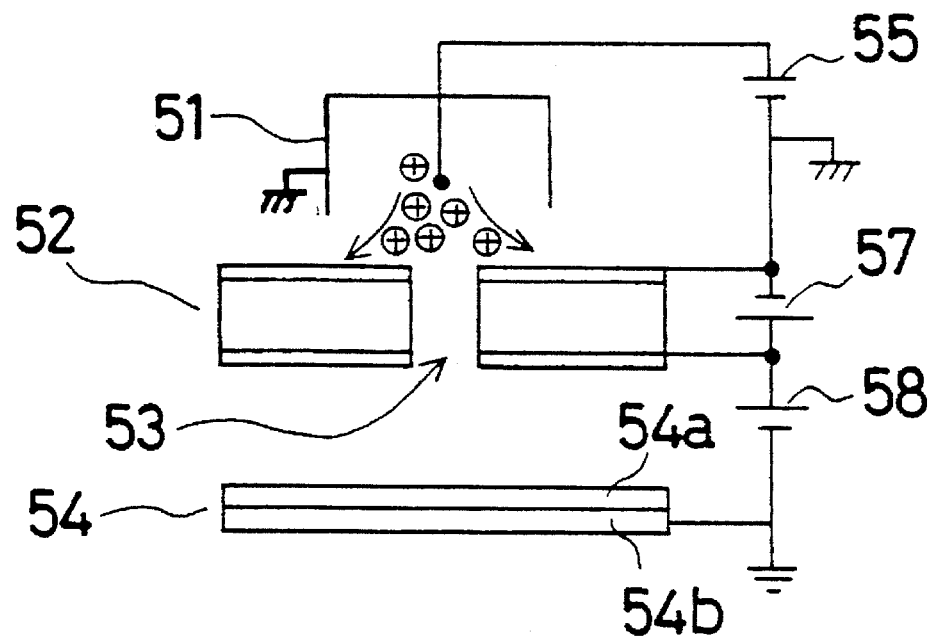

A corotron type of ion printer, shown in FIGS. 24(a) and 24(b) as an example, can be placed under halftone control only by pulse width modulation, because of the constant emission of ions.

FIGS. 24(a) and (b) provide a conceptional representation of such a corotron type of ion printer, wherein reference numeral 51 stands for a corona ion-generation source, 52 an ion head, 52a an upper aperture electrode, 52b an insulating electrode, 52c a lower aperture electrode, 53 a hole, 54 a recording medium, 54a an insulator, 54b an electrically conductive layer, 55 a corona ion-generating power source, 56 and 57 control signal power sources, and 58 a bias electrode.

Corona ion-generating power source 51, for instance, may be built up of a casing electrode 51a and a corona wire 51b laid on in it. A direct-current high voltage is applied by corona ion-generating power source 55 between casing electrode 51a and corona wire 51b to generate corona ions. Upper and lower aperture electrodes 52a and 52c formed on both sides of insulating layer 52b are provided with a through-aperture that corresponds to hole 53 provided through insulating layer 52b to define a unit recording element, and serves to place an ion flow under on/off control in dependence on the polarity of the control signal voltage applied through control signal power sources 56 and 57. The corona ions that have passed through the hole in the insulating layer are guided by an electric field made between the insulating layer and conductive layer 5 of recording medium 4b by bias power source 58, thereby forming a latent image on the insulator 54a of recording medium 54.

In such an arrangement, signal voltage is furnished to lower electrode 52, as shown in FIG. 24(a), to make upper aperture electrode 52a so positive that a corona ion flow can go onto recording medium 54 along an electric field formed in the electrode aperture to form a latent image on insulator 54a. On the other hand, when signal voltage is applied such that the polarity of the signal power source is reversed, as shown in FIG. 24(b), an electric field is formed within the electrode aperture in the direction that prevents any ion flow, and so the ions cannot pass through the aperture. On insulator 54a there is thus formed a latent image that corresponds to a control signal.

In what follows, an illustrative embodiment of the voltage modulation circuit best suited for driving an ion flow control type of halftone image recording hardware will be explained. Of course, it is understood that this embodiment can find use in applications other than the drive circuit for an ion flow control type of halftone image recorder.

Figure 25:
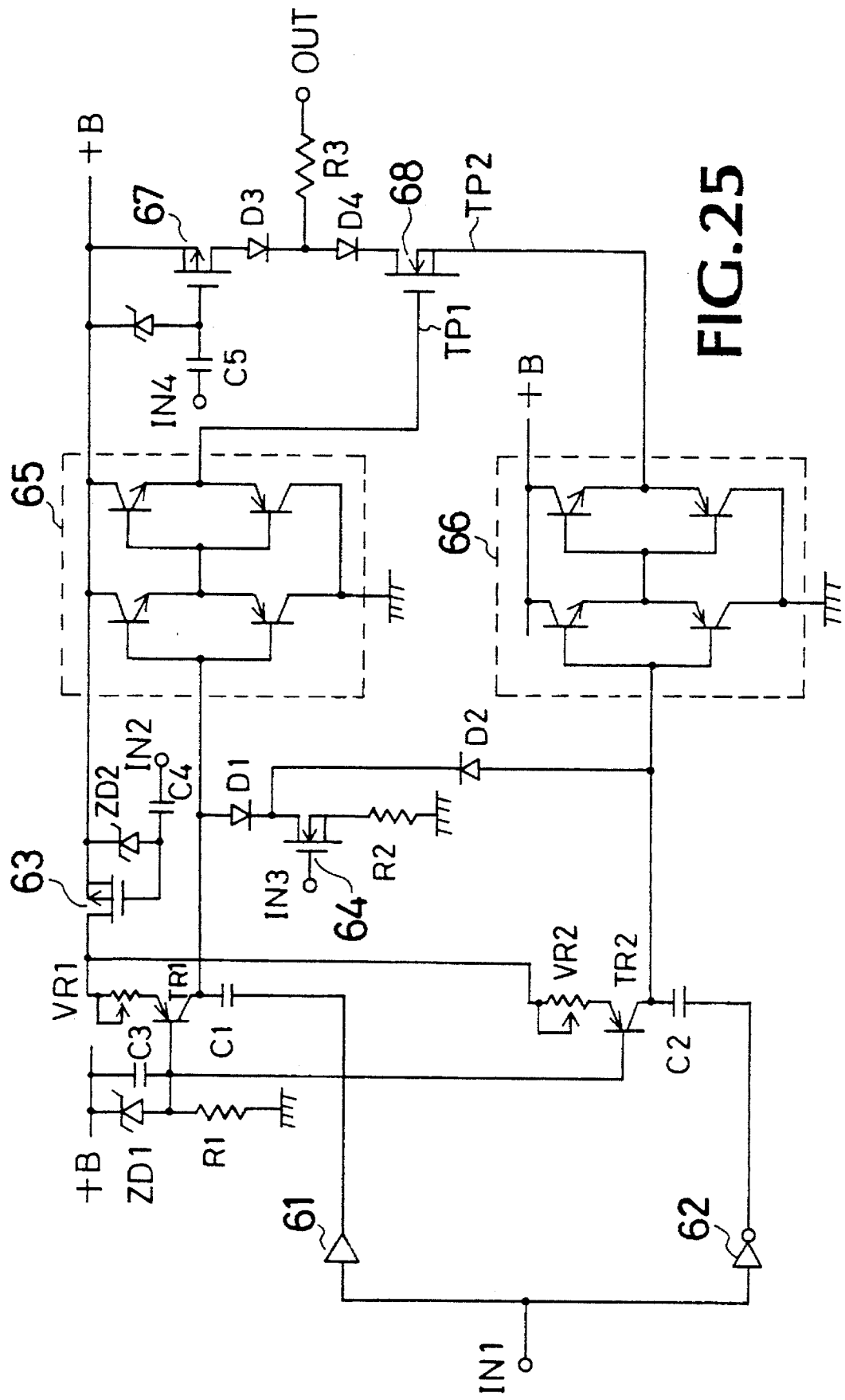
FIG. 25 is a view that illustrates one embodiment of a voltage modulation circuit lending itself well to an ion printer.
Figure 26:
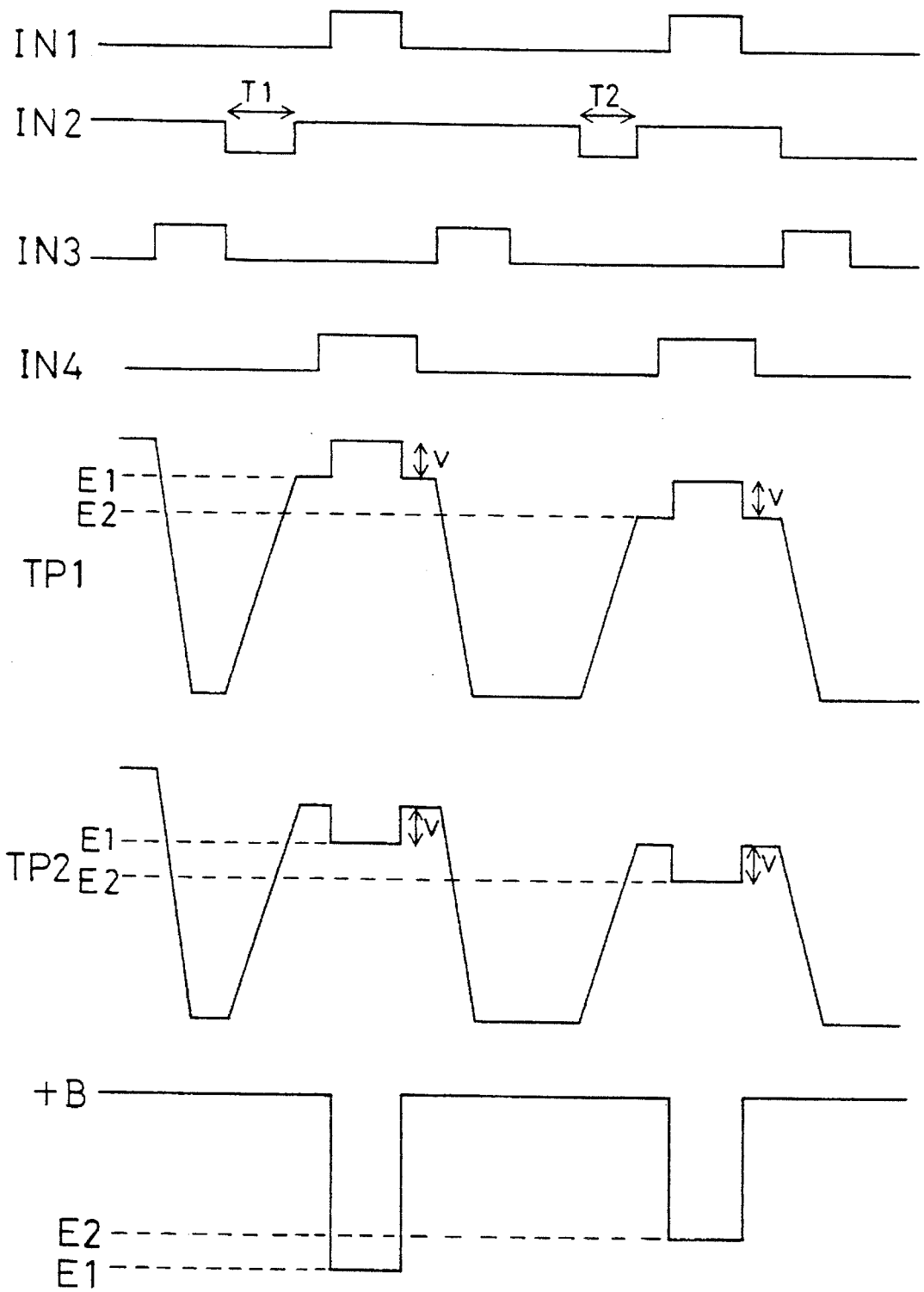
FIG. 26 represents working waveforms.
Figure 27:
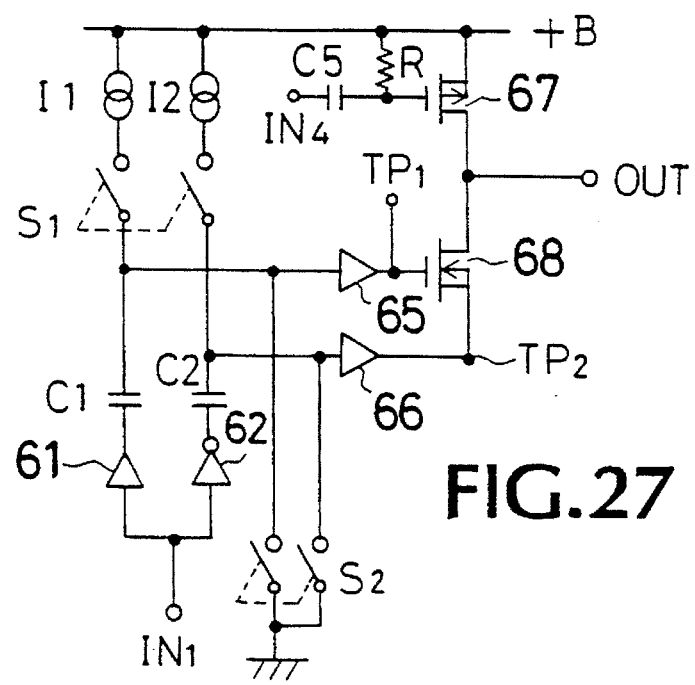
FIG. 27 is a circuit diagram equivalent to FIG. 25, FIGS. 28(a) and 28(b) illustrate arrangements an arrangement comprising a plurality of constant-current circuits.

FIG. 25 is a representation of the voltage modulation circuit according to the instant embodiment, FIG. 26 an illustration of performance waveforms, and FIG. 27 a circuit diagram equivalent to that of FIG. 25. In these figures, reference numerals 61 and 62 are buffer amplifiers, 63 and 67 P-channel MOSFETs, 64 and 68 N-channel MOSFETs, 65 and 66 buffers, TR1 and TR2 transistors, ZD1 to ZD3 constant-voltage diodes, D1 to D4 diodes, C1 to C5 capacitors, R1 to R3 resistances, and VR1 and VR2 variable resistances.

Referring now to FIG. 25, input IN2, for instance, may be a signal of pulse width corresponding to halftone image data, and is applied through capacitor C4 to the gate of P-channel MOSFET 63. P-channel MOSFET 63 is a switching element with constant-voltage diode ZD2 connected between its gate and source. This, when negative voltage is applied to it through capacitor C4, is put on, and the value of gate (negative) voltage, when held on, is defined by the Zener voltage of constant-voltage diode ZD2, as shown by switch S1 in FIG. 27.

The drain of P-channel MOSFET 63 is connected with the emitters of transistors TR1 and TR2 via variable resistances VR1 and VR2. The bases of TR1 and TR2 are each provided with a constant voltage that is divided from power source voltage +B by a series circuit made up of constant-voltage diode ZD1 and resistance R1 to to define the respective constant-current circuits, as shown at I1 and I2 in FIG. 27.

The collectors of TR1 and TR2 that define the respective constant-current circuits I1 and I2 are connected with buffer amplifiers 61 and 62 via coupling capacitors C1 and C1 so as to apply input IN1 to them. Input IN1 is a pulse signal in synchronism with input IN2.

Consequently, P-channel MOSFET 63 is kept electrically conductive as long as input IN2 is negative, so that constant currents can be supplied to coupling capacitors C1 and C2 by the constant-current circuits and charges can thereby be built up to generate a voltage up to a few hundred volts that corresponds to the halftone image data. A 5-V input IN1 is converted to, for instance, 15 V by buffer amplifiers 61 and 62, and is then superposed on this voltage via coupling capacitors C1 and C2. At this time −15 V and +15 V are superposed on capacitors C1 and C2, respectively, because the output of buffer amplifier 62 is reversed in phase. Consequently, if the integrated voltage value is 300 V, for instance, capacitors C1 and C2 then take the values of 315 V and 285 V, respectively.

The collectors of TR1 and TR2 are connected to the drain of N-channel MOSFET 64 by way of diodes D1 and D2. The source of N-channel MOSFET 64 is grounded via resistance R with reset pulse IN3 furnished to the gate, thereby defining a reset circuit, as shown by switch S2 in FIG. 27. This reset circuit, when reset pulse IN3 is applied to it, is actuated to put N-channel MOSFET 64 on, and voltages generated in coupling capacitors C1 and C2 are discharged by way of diodes D1 and D2, N-channel MOSFET 64 and resistance R2 for resetting.

On the other hand, the voltages generated in coupling capacitors C1 and C2 are applied to buffers 65 and 66. Buffers 65 and 66 are each made up of a two-stage arrangement of complementary transistors with the emitters and collectors connected with each other and the bases connected commonly, and serve to output the input voltage as such or without amplification for input-output buffering.

The output stage is composed of a switching circuit in which N-channel MOSFET 68 and P-channel MOSFET 67 are connected in series by diodes D3 and D4, and the outputs of buffers 65 and 66 are applied to the gate and source of N-channel MOSFET 68. The outputs of buffers 65 and 66, when input IN1 is furnished to them, have respectively 315 V and 285 V, for instance; that is, 30 V is applied between the gate and source, so that they can be put on, enabling buffer 66 to produce an output of 285 V. It is noted that MOSFET is actually of a considerably large gate capacity. For instance, now assume coupling capacitors C1 and C2 to have 100 pF. Then, the MOSFET's gate capacity is as large as 70 pF, so that even when the coupling capacitors have ±15 V, the voltage applied between the gate and source is decreased to about ±10 V. Because constant-current diode ZD3 is connected between the gate and source of P-channel MOSFET 67 and because gate input pulse IN4 is furnished to it by way of capacitor C5, this is normally in an off state and, when that pulse IN4 is applied to it, it is made electrically conductive. Diodes D3 and D4 assure that P-channel MOSFET 67 can function exclusively for discharge while N-channel MOSFET 68 can serve exclusively for suction, and so well prevent an adverse influence by "kickback".

Accordingly, an output of +B is obtained, when P-channel MOSFET 67 is put on by the application of gate input pulse IN4, while N-channel MOSFET 68 is put on to enable buffer 66 to produce output, when P-channel MOSFET 67 is put off with the application of input IN1.

In the ensuing description, how the circuit of FIG. 25 works will be explained with reference to FIG. 26.

The voltage integrated by reset pulse IN3 in coupling capacitors C1 and C2 is reset. At a time T1 during which signal input IN2 remains negative, currents are fed from the constant-current circuits to coupling capacitors C1 and C2, so that charges can be accumulated in much the same manner as mentioned above, and the resulting voltage is applied to the gate and source of N-channel MOSFET 68 by way of buffers 65 and 66. Because voltage TP1 furnished to the gate is then equal to voltage TP2 to the source, N-channel MOSFET 68 is held off, and the output voltage is thereby allowed to remain at +B achieved so far.

On the other hand, as signal input IN2 becomes positive, P-channel MOSFET 63 is put off, and the voltages of coupling capacitors C1 and C2 are thereby maintained at voltages corresponding to time duration T1. Then, as input pulse IN1 of amplitude v, for instance, is applied to buffers 61 and 62, amplitudes +v and −v are respectively superposed on voltages TP1 and TP2, so that a voltage of 2 v can be applied between the gate and source of N-channel MOSFET 68 to put it on. When P-channel MOSFET 67 and N-channel MOSFET 68 are then concurrently put on, there is a current so large that gate input pulse IN4 is larger in pulse width than input pulse IN1. Thus, whenever N-channel MOSFET 68 is put on, P-channel MOSFET 67 is held off. Consequently, the output level lies at voltage TP2 or, in a symbol, is a level E1, as shown. As input pulse IN1 drops to a zero level, voltages TP1 and TP2 become equal to each other to put N-channel MOSFET 68 on. Then, the output is maintained at E1 until gate input pulse IN4 drops to a zero level, and as gate input pulse IN4 becomes positive, P-channel MOSFET 67 is put on to produce output +B.

Subsequently and similarly, voltage E2 corresponding to time width T2 of signal input IN2 is outputted. Thus, high-voltage and high-speed performance is achieved, because pulses of voltage corresponding to the time duration of discretely input pulses are produced for those pulses and because the output stage is made up of a switching circuit having no amplifying action.

It is understood that the coupling capacitors must be charged and discharged for each input pulse, because it is required to set output voltage. The then consumed power has nothing to do with output load, and is proportional in magnitude to the capacities of the coupling capacitors. However, especially when capacitor C1 leading to the source electrode is of small capacity, the source potential suffers from some variation under the influence of the capacity of N-channel MOSFET 68 between its gate and source, making it unable to obtain the potential needed between the gate and source for switching. According to the instant embodiment mentioned above, however, certain switching performance is achieved by applying signals of opposite phases to the source and gate electrodes with no need of increasing the capacitors' capacities.

While the above embodiment has been described as being designed to switch the P-channel MOSFET with gate input pulse IN4 and apply the voltages of coupling capacitors C1 and C2 between the gate and source of the N-channel MOSFET, it is understood that the N-channel MOSFET may be switched with gate input pulse IN4 with inverted polarity and the voltages of coupling capacitors C1 and C2 may be applied between the gate and source of the P-channel MOSFET, provided however that the outputs of buffers 66 and 65 are applied to the gate and source, respectively. In an alternative arrangement, the output stage is constructed from P- and N-channel MOSFETs connected in series, as in FIG. 25, and the two same circuits as in FIG. 25 are arranged in parallel between the input stage and the buffer stage (shown at 65 and 66 in FIG. 25). Then, buffer amplifiers 61 and 62 are reversed in polarity by these two circuits, and input IN2 is made up of different data IN2-1 and IN2-2 at varying timings, so that the P-channel MOSFET can be switched by buffers 65 and 66 in one circuit, while the N-channel MOSFET can be switched by buffers 65 and 66 in the other circuit. According to this arrangement, it is possible to alternately obtain data that correspond to date IN2-1 and IN2-2.

Figure 28A:
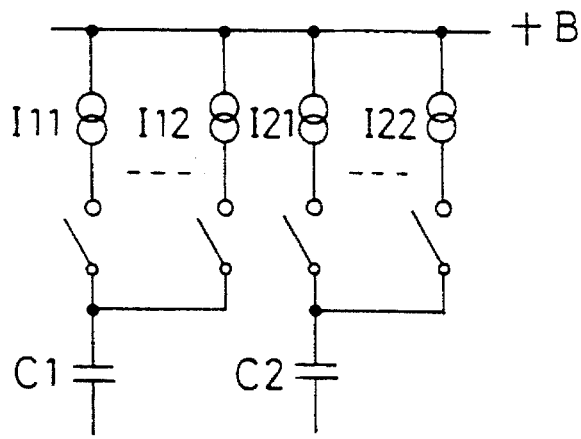
Figure 28B:
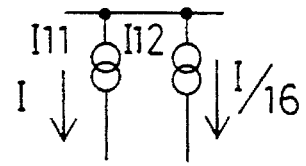

Shown in FIGS. 28(a) and 28(b) are other embodiments of the voltage modulation circuit.

In these embodiments, there are provided a plurality of such constant-current circuits shown in FIG. 27. As can be seen from FIG. 28(b), two constant-current circuits (four in all) are provided per coupling capacitors. For instance, weighting is done for one constant-current circuit I11 such that a current I flows through it and for the other I12 such that a current I/16 flows through it. Then, the constant-current circuits I11 and I12 are controlled by significant 4 bits and insignificant 4 bits of halftone image data, respectively, whereby the conversion of 8-bit halftone image data can be carried out at high speed. In other words, when one constant-current circuit is used, it is required to control 256 halftones at 256 pulse width stages, but use of two constant-current circuits makes it possible to achieve the high-speed conversion of halftone data to a voltage value, because such control is achieved at barely 16 pulse width stages.

Figure 29:
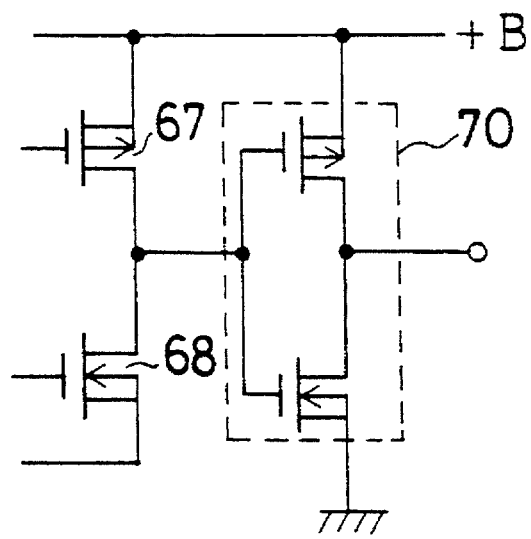
FIG. 29 illustrates an embodiment of an output stage to which a source-follower circuit is added.

FIG. 29 provides an illustration of a further embodiment in which an additional source-follower circuit 70 is provided to the switching circuit forming the output stage. This embodiment enables a large current load to be driven, and for this, only the feed of a current corresponding to the gate capacity of an FET forming the source-follower circuit from the switching circuit is needed.

Figure 30:
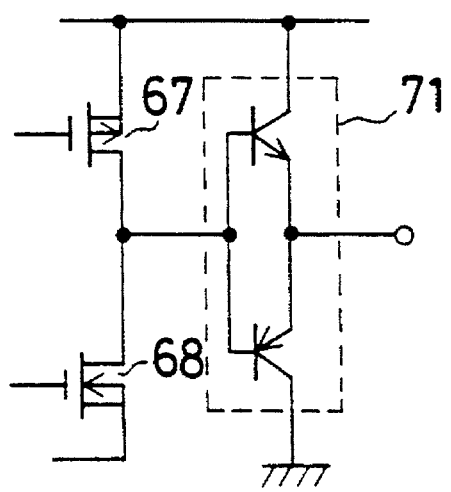
FIG. 30 illustrates an embodiment of the output stage to which an emitter-follower circuit is added.

Shown in FIG. 30 is a still further embodiment wherein an emitter-follower circuit is added to the output stage. Here, too, it is possible to accommodate to a large current load, because the emitter-follower circuit 71 is of input impedance so large that the arrangement can be little affected by the next stage.

While the above embodiments have been described as being designed to obtain an integrated voltage corresponding to input data by use of coupling capacitors and superpose on it a pulse for driving the switching circuit forming the output stage, it is understood that the invention is not limited to them. For instance, it is also possible to convert input data to a voltage corresponding thereto by use of a D-A converter, etc., and superpose a pulse on it by use of a pulse transformer, etc.

According to the above-mentioned embodiment, any voltage amplifier can be dispensed with, because the output stage is constructed from a switching element and because transmission occurs through the emitter-follower circuit. For this reason, this embodiment can work with high-voltage, high-speed pulse output power, and so lends itself best suite for driving an ion printer in particular and may otherwise be used for driving PDPs, ELs, and so on. In addition, power savings and reductions in the number of the parts involved are achievable by using the coupling capacitors connected to the switching element for the purpose of voltage setting (charging).

Figure 31A:
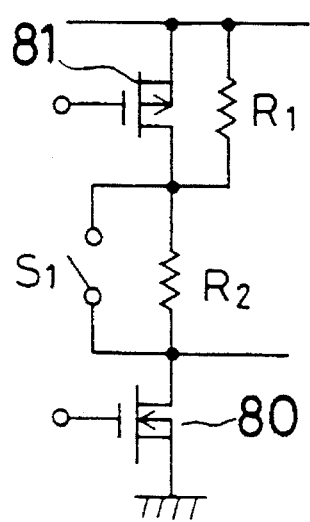
Figure 31B:
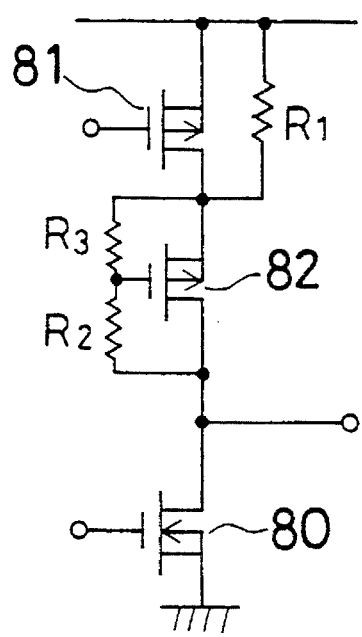

In the following description, another embodiment of the driving circuit that is well suited for an ion printer will be explained at great length. FIGS. 31(a) and 31(b) comprise views that illustrates a basic structure of this .embodiment, and FIG. 32 a view that illustrates output voltage characteristics. In FIG. 31, 80 stands an N-channel FET, 81 and 82 P-channel FETs, S1 a switch and R1, R2 and R3 resistances.

FIG. 31(a) represents a complementary type of driving circuit made up of N-channel FET 80 and P-channel FET 81 are connected in series, in which resistance R1 is connected between the source and drain of P-channel FET 81 and resistance R2 is connected to the drain of P-channel FET 81, with resistance R2 capable of being short-circuited by switch S1.

Explaining the case that switch S1 is opened for driving with reference to FIG. 31(a), the output resistance is only R2, when P-channel FET 81 is held on, because R1 is short-circuited. On the other hand, when N-channel FET 80 is held on (and P-channel FET 81 is held off), the voltage of P-channel FET 81 is expressed by R1/(R1+R2); in other words, a low voltage-resistance FET may be used. Consequently, if R2 is reduced, it is then possible to achieve a rapid rise, but because the voltage impressed on P-channel FET 81 is increased to reduce R2 considerably. To put it another way, if switch S1 is designed such that it is closed when P-channel FET 81 is held on and it is opened when N-channel FET is held on, it is then possible to achieve a rapid rise and to reduce the voltage on the P-channel FET, thereby increasing voltage resistance.

The circuit of FIG. 31(a) is embodied in FIG. 31(b).

The circuit of FIG. 31(b) that is made up of switch S1 and resistance R2 is achieved by an FET in which R2 and R3 are connected between the drain and gate and the gate and source, respectively.

Figure 32:
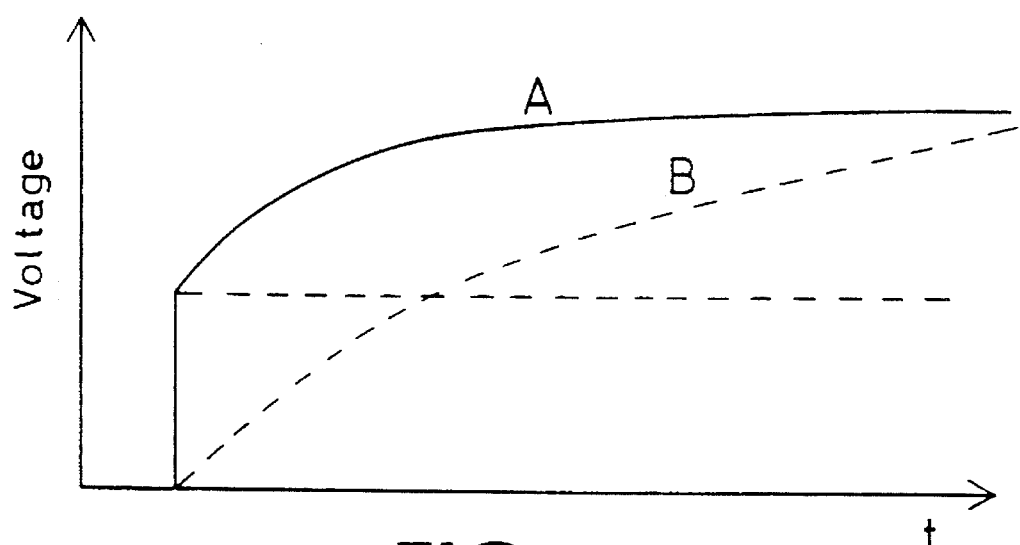
FIG. 32 illustrates output voltage characteristics.

In other words, because P-channel FET 82 is put on simultaneously with P-channel FET 81 on and N-channel FET 80 off, the output resistance is-defined by only the on-resistances of P-channel FETs 81 and 82; a sharp rise is achieved, as shown in FIG. 32. In the case of capacity loading, the output current decreases and, following this, the output voltage increases. This then gives rise to a decrease in the voltage applied between the source and drain of P-channel FET 82 and, when this voltage comes short of a certain threshold value, P-channel FET 82 is put off. Subsequently, the output voltage increases with a time constant determined by resistances (R2+R3) and a loading capacity, depicting such a characteristic curve A as shown in FIG. 32. It is noted that the absence of FET 82 results in a characteristic curve B.

On the other hand, when P-channel FET 81 is put off and N-channel FET 80 is put on, P-channel FET 82 is put off, too. Thus, the voltage on P-channel FETs 81 and 82 are divided by resistances R1, R2 and R3, making it possible to accommodate to high-voltage driving.

Figure 35:
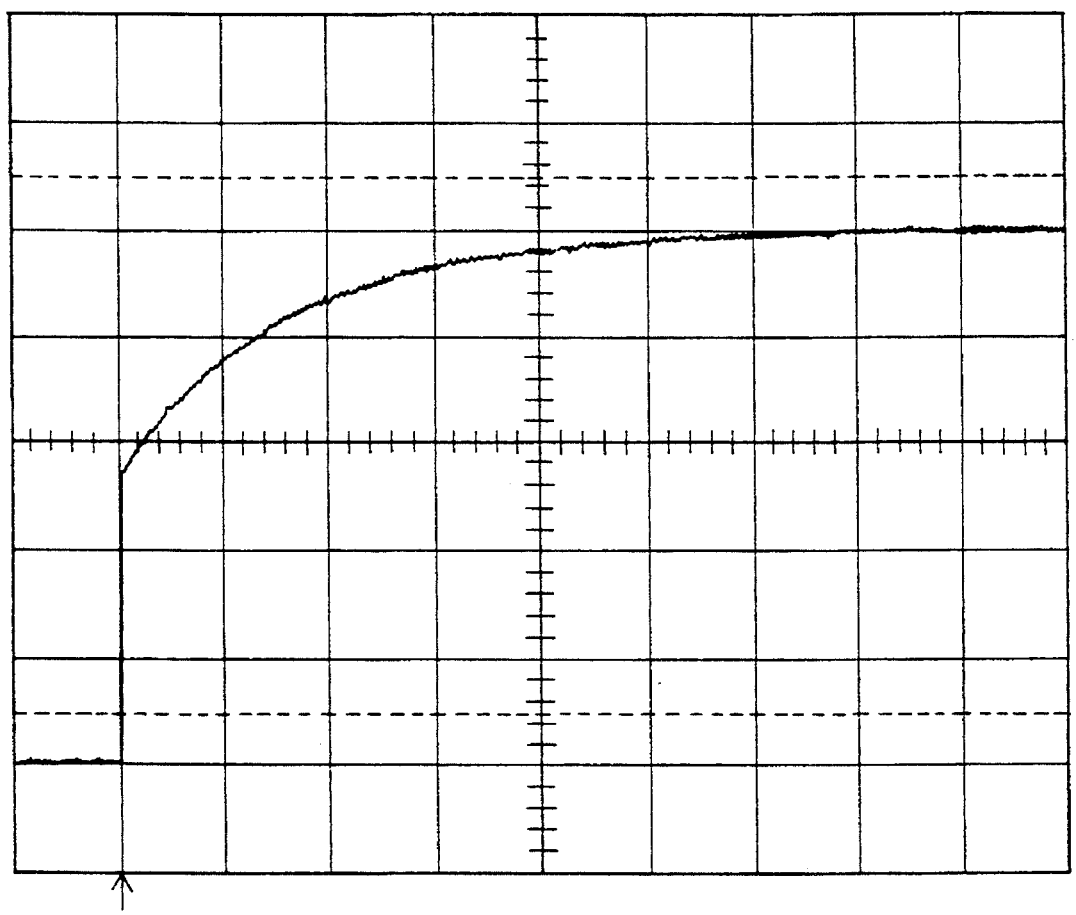
FIG. 35 is an enlarged representation of the waveform.

Here assume that the power source voltage=500 V, R1=300 kΩ, R2=1.6 kΩ and R3=200 kΩ, as shown in FIG. 33 (and FIG. 32 (b) ). Then, the voltage of a terminal TP1 ( i.e., the voltage across resistance R1) and the voltage of a terminal TP2 (i.e., the voltage between the output terminal and the ground) are shown in FIGS. 34(a) and 34(b), respectively, with one scale on the abscissa representing 1 ms and one scale on the ordinate 100 V. An enlarged waveform of a voltage waveform rise at terminal TP2 shown in FIG. 34(b) is depicted in FIG. 35, with one scale on the abscissa representing 25 μs and one scale on the ordinate 100 V. It is seen that 300 V and 200 V are shared by P-channel FET 81 and P-channel FET 82, respectively, and so output voltage characteristics with a sharp rise are achieved.

Figure 36:
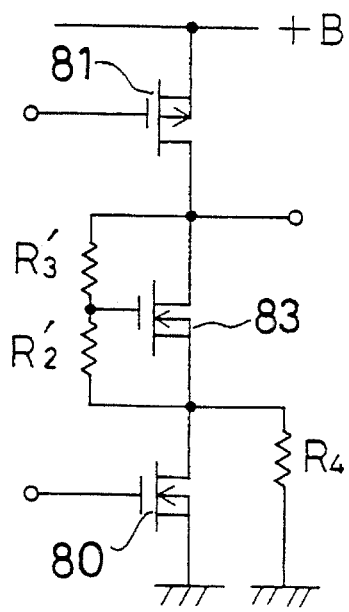
FIG. 36 is an illustrative circuit diagram for increasing the voltage resistance of an N-channel FET.

FIG. 36 is presented for illustrating a further embodiment of the invention.

In this embodiment intended to achieve high voltage resistance by use of a low-voltage N-channel FET 80, resistance R4 is connected between the source and drain of N-channel FET 80, and the drain of N-channel FET 80 is connected with N-channel FET 83 in which resistances R2' and R3' are connected between the source and drain and the gate and drain.

At a rise time at which P-channel FET 81 and N-channel FET 80 are put on and off, respectively, the output resistance is defined by only the on-resistance of P-channel FET 81, giving rise to sharp rise characteristics The voltage then applied on N-channel FET 80 and N-channel FET 83 is divided by resistances R2', R3' and R4'.

At a drop time at which P-channel FET 81 and N-channel FET 80 are put off and on, respectively, N-channel FET 83 is put on, too, so that there are sharp fall characteristics. In the case of capacity loading, the discharge current decreases and, following this, the output voltage decreases, resulting in a decrease in the voltage applied between the source and drain of N-channel FET 8. When this voltage comes short of a certain threshold value, it is put off. Subsequently, the output voltage decreases with a time constant that is determined by resistances (R2'+R3') and the loading capacity.

Because the voltages impressed on N-channel FETs 80 and 83 when P-channel FET 81 is held on are thus divided by resistances R2', R3' and R4, it is possible to accommodate to high-voltage driving.

Figure 37:
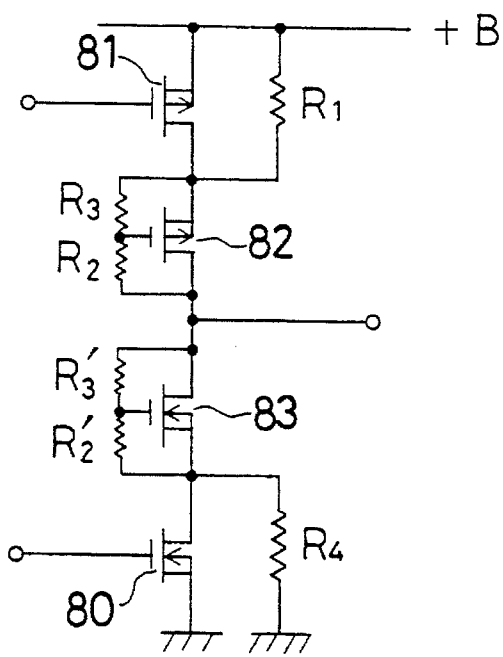
FIG. 37 is an illustrative circuit diagram for increasing the voltage resistance of N- and P-channel FETs.

FIG. 37 is presented for illustrating a still further embodiment of the invention.

In this embodiment, resistances are connected between the sources and drains of both N-channel FET 80 and P-channel FET 81, while an FET with resistances connected between the source and gate and the gate and drain is connected to the drain sides of N-channel FET 80 and P-channel FET 81. More specifically, P-channel FET 82 with resistances R2 and R3 connected between the drain and gate and the gate and source is connected to the drain of P-channel FET 81, as in FIG. 31(*b*), and N-channel FET 83 with resistances R2' and R3' connected between the source and gate and the gate and drain is connected to the drain of N-channel FET 80, as in FIG. 36.

According to this embodiment, even when either one of N-channel FET 80 and P-channel FET 81 is put on, the voltage applied on the other is divided by series-connected resistances. It is thus possible to achieve high-voltage driving with the use of low-voltage N- and P-channel FETs and, at the same time, it is possible to make rise and fall characteristics sharp.

In each of the above-mentioned embodiments, one FET with resistances connected between the source and gate and the gate and drain is used with the P- and N-channel FETs. It is understood, however, that if a plurality of such FETs are connected in series and their voltage values (threshold voltages) at both their ends to be put off are varied, they are all put on at a rise time and, with an output voltage rise, they are put off one by one, giving an output waveform that approaches the power source voltage or ground level in a stepwise form. This makes it possible to achieve higher speed and higher voltage resistance.

While switch S1 and resistance R2 of FIG. 31(*b*) have been described as being achieved by an FET with resistances R2 and R3 connected between the drain and source and the gate and source, it is understood that this element constitutes an equivalent two-terminal element that is put on, when a current of a certain or higher value passes through it, and shows constant-voltage characteristics, and that is put off, when a current of a certain or lower value passes through it, and becomes a constant resistance. Similar effects are obtained, even when a constant-voltage discharge tube with a resistance connected in parallel therewith, a gas-filled discharge tube such as a neon lamp for display purposes, a constant-voltage diode with a resistance connected in parallel therewith, and so on are used for this equivalent two-terminal element. This element is also well suited for driving PDPs, ELs, etc., and for driving an ion printer in particular.

What we claim is:

1. A circuit for driving a halftone image device which comprises a voltage modulation circuit for converting discontinuously fed input data to voltage signals for output, characterized by comprising a voltage signal-generation circuit for generating voltage signals corresponding to the input data, a reset circuit for resetting the resultant voltage at a predetermined timing, a pulse voltage-superposition circuit for superposing pulse voltages of opposite phases on the resultant voltage signals, and a switching circuit that comprises a series combination of P- and N-channel MOSFETs, is provided for applying two voltage signals with pulse voltages of opposite phases superposed on them to the gate and source electrodes of the N- or P-channel MOSFET by way of a buffer, and is controlled such that when the N- or P-channel MOSFET is held off, the P- or N-channel MOSFET is put on.

2. A circuit as recited in claim 1, characterized in that the voltage signal-generation circuit and the pulse voltage-superposition circuit each comprise two coupling capacitors connected to a constant-current circuit, and pulse voltages of opposite phases are applied to said two coupling capacitors.

3. A circuit for driving a halftone image device which comprises a voltage modulation circuit for converting discontinuously fed input data to voltage signals for output, characterized by comprising first and second voltage signal-generation circuits for generating voltage signals corresponding to the respective input data, first and second reset circuits for resetting the resultant first and second voltages at predetermined timings, first and second pulse voltage-superposition circuits for superposing pulse voltages of opposite phases on the resultant first and second voltage signals, and a switching circuit that comprises a series combination of P- and N-channel MOSFETs, and characterized in that two voltage signals with pulse voltages of opposite phases superposed on the first voltage signal are applied in the form of switching signals to the gate and source electrodes of the N- or P-channel MOSFET by way of a first buffer, and two voltage signals with pulse voltages of opposite phases superposed on the second voltage signal are applied in the form of switching signals to the gate and source electrodes of the N- or P-channel MOSFET by way of a second buffer.

4. A circuit as recited in claim 1 or 3, characterized in that a source- or emitter-follower circuit is connected to the output of the switching circuit.

5. A circuit as recited in claim 3, characterized in that at least one of the first and second voltage signal-generation circuits and at least one of the first and second pulse voltage-superposition circuits each comprise two coupling capacitors connected to a constant-current circuit, and pulse voltages of opposite phases are applied to said two coupling capacitors.

6. A circuit as recited in claim 2 or 5, characterized in that a plurality of constant-current circuits are provided for feeding constant currents to the coupling capacitors to weight the current values of the respective constant-current circuits.

7. A complementary circuit for driving a capacitive load or a halftone image device which comprises a series combination of P- and N-channel FET driving elements that are alternately placed under on-off control, characterized in that a resistance is connected between the source and drain of at least one of the P- and N-channel FET driving elements, and at least one equivalent two-terminal element is connected between said FET driving elements and in series to at least one of the FET driving elements, said equivalent two-terminal element being put on with a current of a certain or higher value passing therethrough to show constant-voltage characteristics and put off with a current of a certain or less value passing therethrough to give a constant resistance.

8. A circuit as recited in claim 7, characterized in that the equivalent two-terminal element is made up of an FET with resistances connected between the drain and gate and the gate and source, respectively.

9. A circuit as recited in claim 7, characterized in that the equivalent two-terminal element is made up of a gas-filled discharge tube with a resistance connected in parallel therewith.

10. A circuit as recited in claim 7, characterized in that the equivalent two-terminal element is made up of a constant-voltage diode with a resistance connected in parallel therewith.

11. A circuit as recited in claim 1, 3 or 7, characterized by being a circuit for driving an ion printer.

\* \* \* \* \*